US012474246B2

(12) United States Patent
Crandall et al.

(10) Patent No.: US 12,474,246 B2
(45) Date of Patent: Nov. 18, 2025

(54) AUTOMATED TURF TESTING APPARATUS AND SYSTEM FOR USING SAME

(71) Applicant: BioCore LLC, Charlottesville, VA (US)

(72) Inventors: Jeff Crandall, Charlottesville, VA (US); Richard Kent, Keswick, VA (US); Edward Meade Spratley, Charlottesville, VA (US); Jared Yoder, Aroda, VA (US); Thomas Cisneros, Petaluma, CA (US); Philipe Aldahir, Chattanooga, TN (US); Jeff Lipari, Petaluma, CA (US)

(*) Notice: Subject to any disclaimer, the term of this patent is extended or adjusted under 35 U.S.C. 154(b) by 653 days.

(21) Appl. No.: 17/509,422

(22) Filed: Oct. 25, 2021

(65) Prior Publication Data

US 2022/0039747 A1 Feb. 10, 2022

Related U.S. Application Data

(62) Division of application No. 17/192,752, filed on Mar. 4, 2021, now Pat. No. 11,154,244.

(Continued)

(51) Int. Cl.
*G01N 3/00* (2006.01)
*A61B 5/00* (2006.01)
(Continued)

(52) U.S. Cl.
CPC .............. *G01N 3/32* (2013.01); *G01N 3/00* (2013.01); *G01N 3/08* (2013.01); *A61B 5/1038* (2013.01); *A61B 5/6807* (2013.01); *G01N 19/02* (2013.01)

(58) Field of Classification Search
CPC ...... A61B 5/6807; A61B 5/1038; G01N 3/32; G01N 3/08; G01N 3/00; G01N 19/02
See application file for complete search history.

(56) References Cited

U.S. PATENT DOCUMENTS 2,638,776 A * 5/1953 Aines .................. A43D 999/00
73/7
4,051,713 A * 10/1977 Bao ........................ G01N 19/02
73/9

(Continued)

FOREIGN PATENT DOCUMENTS

JP       H0221240 A       1/1990
WO    WO-2005024396 A1 *  3/2005  ............. G01N 19/02

OTHER PUBLICATIONS

Yu et al., "Deep learning for image-based weed detection in turfgrass", European Journal of Agronomy, vol. 104, Mar. 2019, pp. 78-84, <https://www.sciencedirect.com/science/article/pii/S1161030118306129>. (Year: 2019).*

(Continued)

*Primary Examiner* — Jonathan M Dunlap
(74) *Attorney, Agent, or Firm* — Woods Rogers Vandeventer Black PLC; Nathan A. Evans

(57) ABSTRACT

A mobile apparatus that is automated to measure controlled and applied forces and moments to sport surfaces allowing for performance and safety assessment of athletic apparel and athletic surfaces, such as natural or artificial turf. The apparatus is capable of using not only shear and compressive forces, but also rotational moments, and all prescribed forces and moments in combination at the same or different times. The apparatus and related system can link these forces and moments together and combine them to more closely mimic behaviors of a human foot during an athletic movement, thereby applying and measuring interactions between all forces and moments at the same or different times.

23 Claims, 23 Drawing Sheets

US 12,474,246 B2
Page 2

Related U.S. Application Data

(60) Provisional application No. 62/985,126, filed on Mar. 4, 2020.

(51) Int. Cl.
*A61B 5/103* (2006.01)
*G01N 3/08* (2006.01)
*G01N 3/32* (2006.01)
*G01N 19/02* (2006.01)

(56) References Cited

U.S. PATENT DOCUMENTS

| | | | |
|---|---|---|---|
| 5,259,236 A | 11/1993 | English | |
| 6,854,316 B2* | 2/2005 | Hage | G01N 19/02 73/9 |
| 7,000,451 B1* | 2/2006 | Wegand | G01N 19/02 73/9 |
| 7,290,436 B2* | 11/2007 | Olde Weghuis | G01N 19/02 73/866 |
| 7,628,059 B1* | 12/2009 | Scherbring | E02D 1/022 73/84 |
| 8,327,693 B2* | 12/2012 | Scherbring | G01N 3/40 73/84 |
| 9,222,866 B2* | 12/2015 | Cline | G01N 3/303 |
| 9,464,980 B2* | 10/2016 | Yngve | G01N 19/02 |
| 10,976,237 B2* | 4/2021 | Gray | A43D 1/08 |
| 10,983,037 B2* | 4/2021 | Sick | G01N 19/02 |
| 2004/0149005 A1* | 8/2004 | Hage | G01N 19/02 73/9 |
| 2005/0178184 A1* | 8/2005 | Stroppiana | G01N 3/48 73/12.13 |
| 2006/0130556 A1* | 6/2006 | Olde Weghuis | G01N 19/02 73/9 |
| 2011/0203356 A1* | 8/2011 | Scherbring | G01N 3/40 73/84 |
| 2012/0297889 A1 | 11/2012 | Yngve | |
| 2018/0283965 A1* | 10/2018 | Matsuzawa | G01L 5/167 |
| 2019/0302003 A1* | 10/2019 | Sick | G01N 3/56 |
| 2019/0346261 A1* | 11/2019 | Carson | A01B 39/12 |
| 2019/0369005 A1* | 12/2019 | Gray | A43D 1/08 |
| 2020/0081938 A1* | 3/2020 | Aldahir | G06Q 90/00 |
| 2020/0131718 A1* | 4/2020 | Aldahir | E01C 13/04 |
| 2021/0381951 A1* | 12/2021 | Dickson | A43D 1/08 |

OTHER PUBLICATIONS

Crandall et al. "Overview of Ongoing Shoe/Foot/Ankle Applied Research", May 30, 2014. <https://nflps.org/wp-content/uploads/2012/05/ShoeManufacturerMtg_Crandalla.pdf> (Year: 2014).*

Mochida et al. "Computer vision-based phenotyping for improvement of plant productivity: a machine learning perspective", GigaScience, vol. 8, 2018, pp. 1-12, <https://academic.oup.com/gigascience/article-pdf/8/1/giy153/27359533/giy153.pdf> (Year: 2018).*

Application No. PCT/US2021/020917, European Search Report dated Feb. 15, 2024.

* cited by examiner

FIGURE 15 – Shaft Actuation Assembly

FIGURE 16 - Shaft Actuation Assembly – Cross-section

FIGURE 17 - Shaft Bearing Assembly – SIDE

Footform – ISO

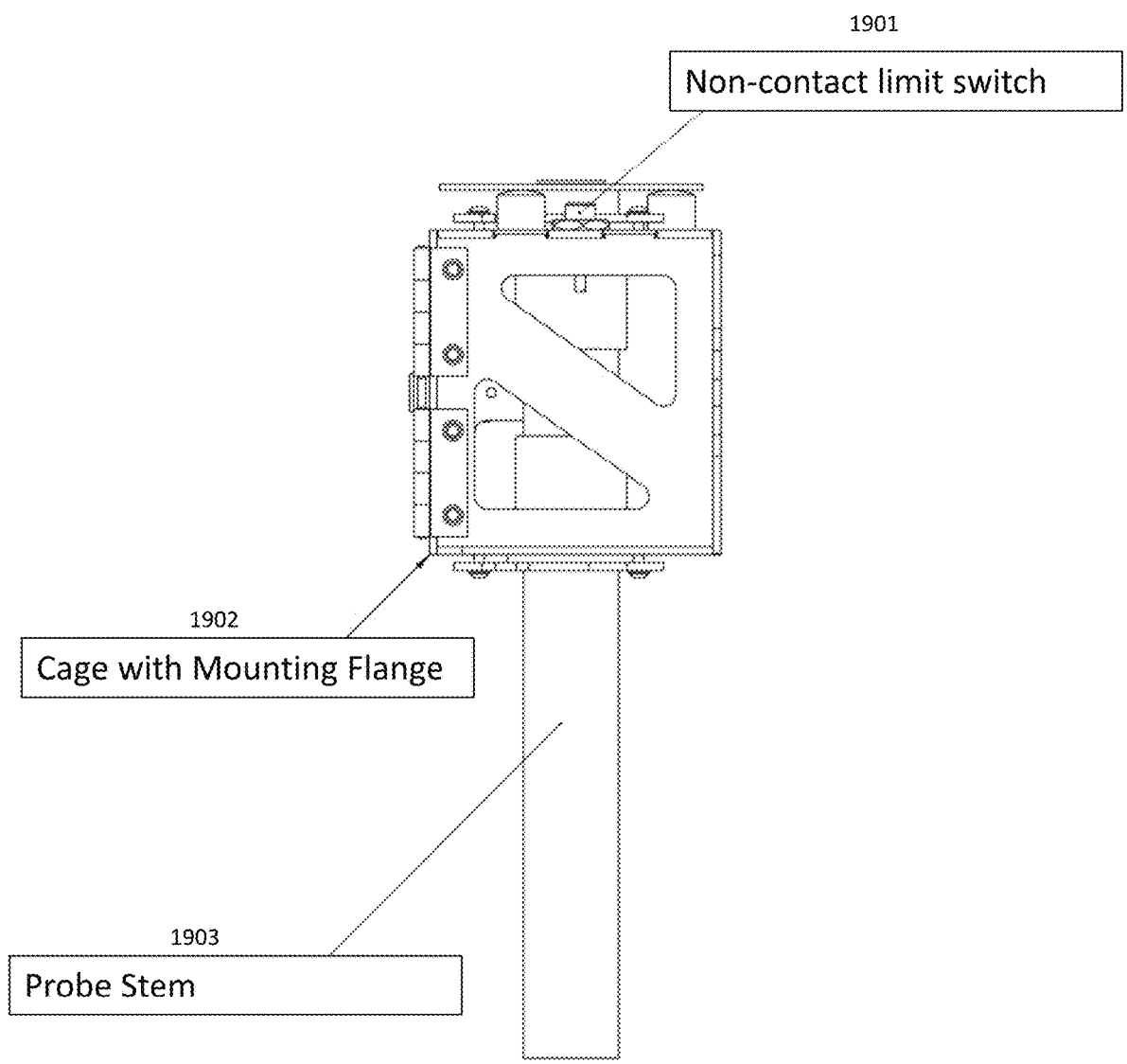
FIGURE 19 - Turf Datum Finder – SIDE

Impact Tester & Consolidated Data Capture – Automated by Solenoid

FIGURE 22 - Device Control Diagram
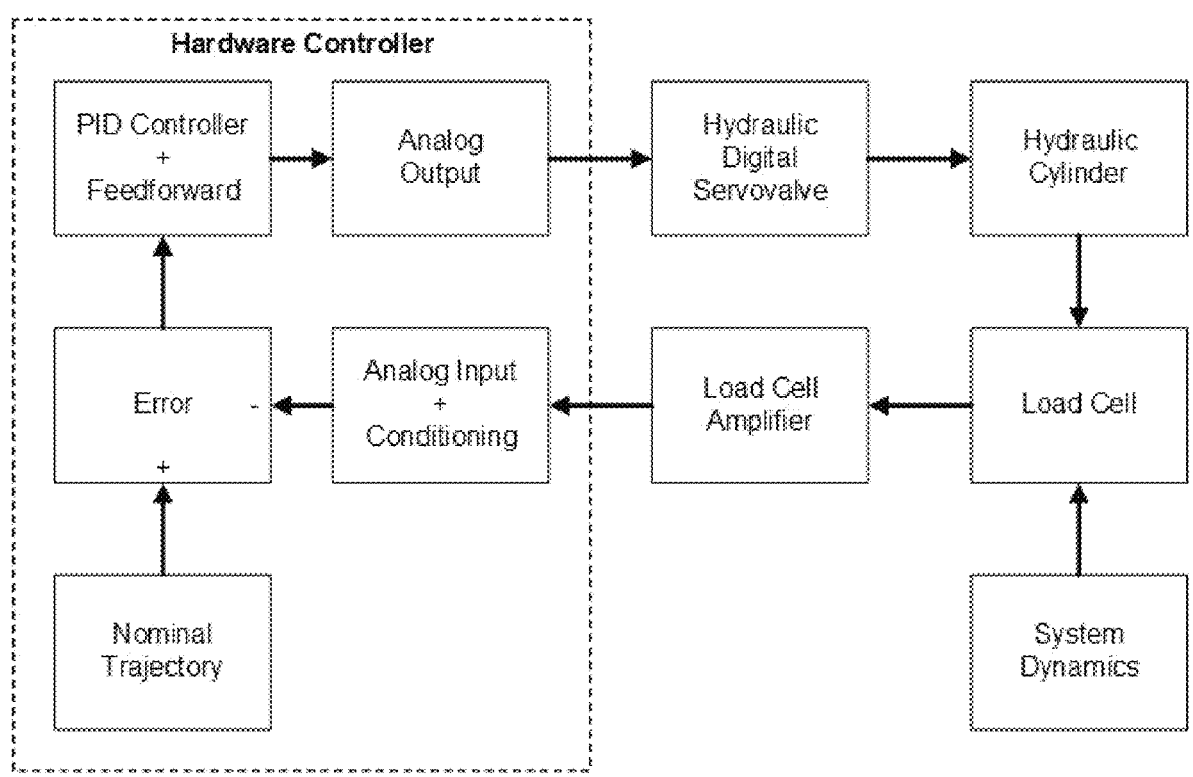

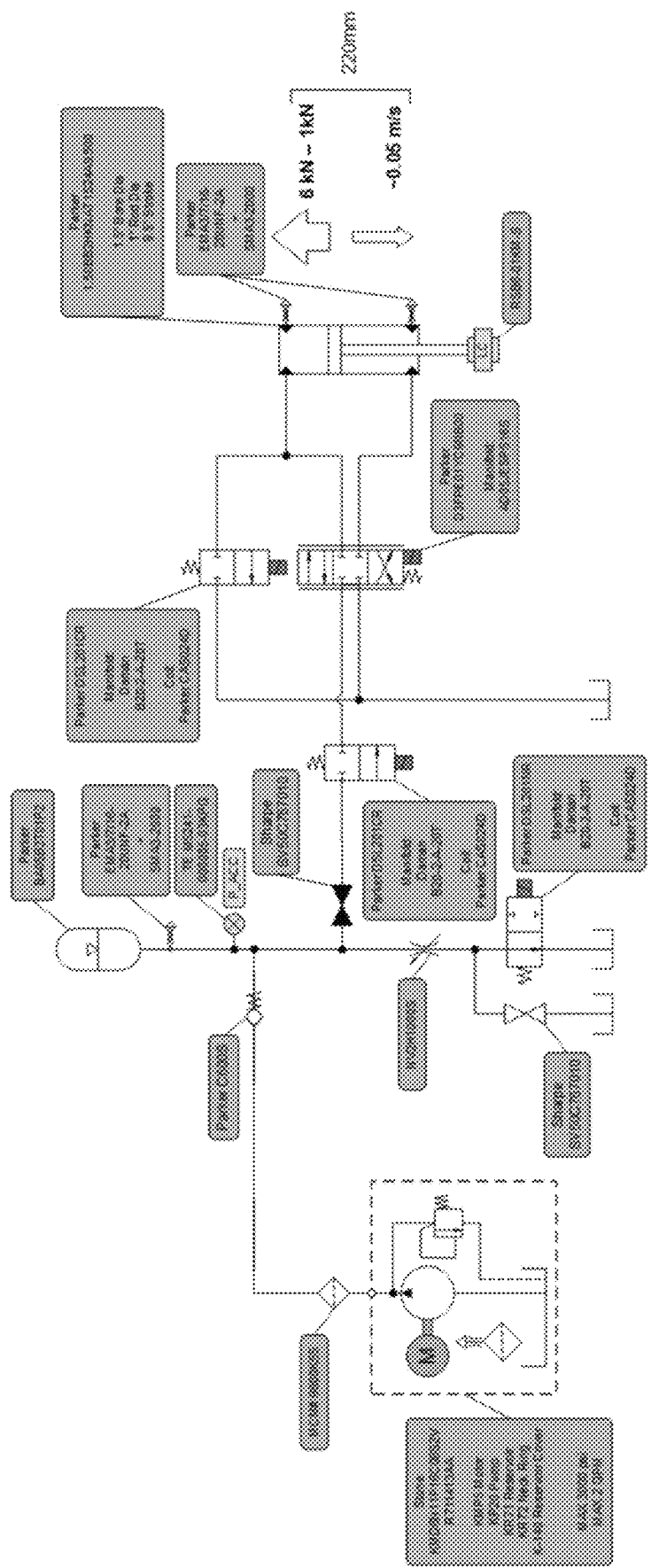
FIGURE 23 - Device Power Architecture

AUTOMATED TURF TESTING APPARATUS AND SYSTEM FOR USING SAME

CROSS-REFERENCE TO RELATED APPLICATIONS

The present application is a divisional of and relies on the disclosures of and claims priority to and the benefit of the filing dates of U.S. application Ser. No. 17/192,752, filed Mar. 4, 2021, and U.S. Provisional Application No. 62/985,126, filed Mar. 4, 2020. The disclosures of those applications are hereby incorporated by reference herein in their entireties. Information from the following related website is also hereby incorporated by reference in its entirety: https://www.figma.com/proto/PeRRW6ZRPMwgMkVAZ4n6yl/BEAST-UI?node-id=4%3All&viewport=9974%2C-566%2C0.7194263339042664&scaling=min-zoom

BACKGROUND OF THE INVENTION

Field of the Invention

The present invention relates to a mobile apparatus and associated system that is completely or partially automated and is configured to measure surface (e.g., sports turf) characteristics related to performance and safety of athletic apparel and equipment accurately and consistently in an apparel-to-surface interaction, in a manner that is quantifiable and repeatable. This application uses sports turf as an example but is not limited to sports turf, because the invention can be used with non-grass and non-turf surfaces using an appropriate appendage, instrumentation, and/or loads and motions particular to a certain sport (e.g., tennis, baseball, football, soccer, horse racing, and so on). In examples only, sports turf is considered to be any surface, naturally or artificially constituted, prepared for sporting events (e.g., games and matches), within a sport governing body's rules and regulations. For example, it comprises the surface and the immediate underlying environment, managed and prepared for playing such as in American Football and Soccer. With reliable gameday, practice, or other data, cause and risk of injury on natural or synthetic turf, as well as player performance related to the interaction with the surface (footing), can be better understood, predicted, and managed through field, apparel, and equipment characterization and rating(s). Moreover, as described herein, the apparel/surface interaction contributes to athletic performance, which, according to the present invention, could also be better characterized, understood, predicted, and enhanced Accurately and consistently quantifying surface conditions, as well as the effect of those conditions on athletic apparel in situations and conditions that mimic athletic movement, can be used to reduce athletic injury occurrences, improve player performance, inform selection of athletic apparel and equipment, and establish accurate, independent standards for surface providers, surface installation and maintenance, prevent expensive stadium rework, and can lead to standardizing field and surface assessments across sports fields, including but not limited to American football and soccer, just to name two examples. With the instrumentation, system, products, and methods described herein, and a sport-specific appendage or other instrumented interface, these tests could be performed on clay surfaces (e.g., baseball skins, warning track, tennis courts), hard surfaces (e.g., tennis, pickleball, volleyball, basketball), sand surfaces (e.g., beach volleyball, bocce, horse tracks), and other grassed (artificial or natural) surfaces such as horse tracks and cricket fields/pitches. With the present invention's instrumentation, the apparatus and system could also be used to quantify performance of a golf club or surface by characterizing a club to surface interaction, including an interaction that results in a portion of the playing surface being impacted by the club head. Such testing may also be used in non-athletic environments where synthetic or natural surfaces are utilized. To accomplish adequate testing for quantifying surface conditions and effects of athletic apparel and equipment, the apparatus taught herein uses shear, compressive, torsional forces and moments, and combinations of these three forces in combination, from between slow quasistatic to high-rate impact loading rates. Thus, the apparatus and system can apply shear and compressive forces, and torsional moments, and combine these together into a single motion to more closely mimic behavior of, for example, a human foot, leg, or entire body during an athletic movement, thereby applying and measuring interactions between multiple forces and moments at the same or different times. The tester uses prescribed forces or motions derived from the kinetics and kinematics of athletic participants and/or equipment.

Description of Related Art

In the National Football League ("NFL"), for example only, there is a significantly different injury rate for lower extremity by different surface types. There have been ongoing attempts to determine why this is; however, the results are inconclusive. This suggests that the data currently being collected can be improved upon. Currently, typically before every game, the turf is manually inspected, and the data is recorded for reference if an injury were to occur.

While current on-field tests include impact hardness, infill depth and evenness, soil moisture content, surface shear resistance using a shear vane, percentage ground cover, visual inspection, and stability rating (post-game), the current tests have proven to be inconsistent, non-comprehensive, and subjective. Injuries continue to be a problem in all sports despite currently available safeguards, and a need exists for an improved way to attempt to decrease athletic injuries across all sports, especially those played on turf.

Mitigation and intervention strategies for injury reduction, however, cannot be developed without athletic performance consideration, as the interaction between the athletes' and the surface require some amount of grip and traction for the athletes to be able to execute motions and maneuvers. Objective characterization of the performance regime is currently lacking. The present invention aims to use biomechanically informed and prescribed forces or motions to objectively characterize the athletic performance regime regarding athlete to surface interaction.

SUMMARY OF INVENTION

Due to the current limitations, it is an object of the current invention to allow for data collection on, for example, shoe-to-surface interaction resulting from applied forces in order to quantitatively evaluate the shoe/surface mechanical interaction for regimes relevant to both injury and performance as well as related to surface and/or shoe characteristics. In aspects, data collection might include, for example, kinetic and kinematic data during the shoe-surface interaction, measurement of surface characteristics through additional measuring devices, and recording of characteristics of the shoe and/or surface used for the shoe-surface interaction test. Because of the capabilities of the current invention, when injuries occur, the incidence of injury can be traced back to the surface data or apparel data collected by the inventive apparatus and compared amongst other cases of injury or, alternatively, with cases of non-injury. Once common injury and non-injury metrics, along with injury risks are established, by way of example only, mechanical parameters measured can be minimized in the manufacture of turf or athletic apparel and equipment, thereby reducing injuries, and improving performance, based on quantifiable data. To accomplish this, the current invention is, in aspects, mobile and completely or partially automated, and configured to provide reliable data that is repeatable and reproducible.

It is an object of the current invention to test the safety and performance of artificial or natural turf, and/or athletic apparel and equipment, especially shoes including but not limited to cleats, using a shoe-surface tester that determines and analyzes the mechanical interactions between shoes and an athletic playing surface, and performs other measurements commonly taken on sporting surfaces, and/or determines and analyzes whether the shoes and/or playing surface are up to standards and/or deemed safe for athletic events. The device simulates and measures shoe-to-surface interactions at controlled loads and rates, created or generated by athletes during performance up to and including those deemed to be injurious. This involves measuring displacement, velocity, and acceleration components of the appendage, for example a shoe and/or foot-form, in all directions, as well as in rotation, and any combination of these forces at the same or different times. The apparatus may apply or measure all components (dx, dy, dz, rx, ry, rz) of six degrees of freedom forces and moments of the appendage by means of one or an array of independent or overlapping sensors.

The apparatus may use an appendage connected to a system of nested frames, such as Stewart platform, to accomplish this. Thus, the appendage (e.g., cleat) is actuated through its prescribed load or positional path by a mechanism capable of imparting and withstanding the significant forces and moments without unwanted mechanical deformation, friction, or fatigue that might otherwise influence the data collected. In embodiments, the device may also automate or assist with:

a) Computer-aided visual inspection of the surface during the shoe-surface interaction using high-speed (e.g., by way of example only, around 500 fps) camera(s) aided through machine learning visual recognition technologies with data synchronization, as well as photographic inspection of the surface before and/or after the test to identify foreign objects, quality of the artificial or natural turf, measure ground cover of natural turf, or perform other analyses such as surface evenness or grass coverage/density.
 b) Measurement of Energy absorption and rebound/return through measurement of acceleration of a mass or mass-spring system dropped onto turf, through an on-board data collection system, and reporting of this data to the user.
 c) Measurement of surface hardness (e.g., Head Injury Criterion measure; Gmax acceleration metric), using devices specified in ASTM F1702 and/or ASTM F355 or other drop test standards, collected through an on-board data collection system, and reporting of this data to the user.
 d) Depth measurement (e.g., infill depth and/or evenness);
 e) Assessment of surface stability using, for example, surface shear resistance through the use of a connected shear vane;
 f) Detection of turf moisture levels;
 g) Measurement of environmental factors, such as air temperature, ground temperature, air humidity, or other factors;
 h) Characterization of field maintenance; and/or
 i) Measurement of the top surface of the turf, relative to a datum on the invention, and reporting of that info back to the data collection system.

It is a further object of the current invention to fully characterize the surface in a way sufficient to direct changes to the surface and/or shoes for improved performance and/or injury prevention. This mechanism will incorporate all or part of the tests in a controlled manner. By actuating test modes, the system can rely on the data being consistent across stadiums as human-to-human variability inherent in testing with manually powered devices is removed from the process. For example, the system may automatically restrict or fix degrees-of-freedom as appropriate for the desired test mode. The system may also automatically raise or lower the appendage for the test, as appropriate. The system may also incorporate locational measurements of the top surface of the test surface into test actuation or data processing. To maintain safety, the system may display the current "state" of the system (for example, whether the system is safe for manual operations or ready to execute a test). Existing tests that will be automated are, by way of example only, surface hardness and/or energy absorption and/or return, infill depth and evenness, soil moisture content, surface shear resistance, and/or percentage ground cover detection. In addition to actuating existing tests, this improved system will also have temperature, pressure, and humidity sensors. Finally, the device can utilize a translation-rotation appendage as in a foot-form that can be shod with various footwear that in turn can engage with the ground to analyze shoe or cleat release dynamics.

The foot-form is representative of an athlete's foot in a cleat or shoe and is interchangeable for customizability. This extremity may have roll, pitch, and yaw adjustability to collect data on varying cleat-to-turf interface angles, as well as allow adjustment of degrees of freedom within the foot-form itself, such as by way of example only, in the angle of the "toe" of the foot-form relative to the rest of the foot-form in order to approximate toe flexion of the foot about the metatarsophalangeal ("MTP") joint, yet hold these adjustments fixed in a static pose while testing is occurring. The foot-form may also dynamically control and move in roll, pitch, yaw, and/or other degrees of freedom, such as toe angle, while testing is occurring, as appropriate. This end effector will be attached to its translation and rotation actuation mechanism via a multi-axis load cell, in aspects. This load cell will collect force and moment data on the foot-form as it moves relative to the surface via, for example, a data acquisition unit. The data collector, such as a computer, will also be recording data from rotational and translational displacement sensors to detect linear position and velocity of the shoe as well as angular rotations and velocities of the shoe. Accelerations of the foot form may also be measured to either characterize the interaction of the shoe with the surface or to allow characterization of the inertial effects of the device during testing.

In other embodiments, the invention described herein is an apparatus configured to apply controlled shear and compressive forces and rotational moments to an end effector as prescribed, wherein the applied forces and moments mimic a behavior of a human foot or other body part during an athletic movement or reflect forces and/or moments associated with injury and/or performance of a subject's foot or other body part (e.g., the loads generated by football players in the NFL), wherein applying and measuring interactions between prescribed forces, rotational moments, and rotational and linear displacements allows for a safety and/or performance evaluation of a subject, athletic apparel and equipment, or an athletic playing surface.

In another embodiment, the invention described herein is an apparatus configured to apply controlled shear, compressive, and/or rotational displacements to an end effector as prescribed, wherein the applied displacements mimic a behavior of a human foot or other body part during an athletic movement or reflect displacements associated with injury and/or performance of a subject's foot or other body part (e.g., motion profiles resulting from athletic tasks resulting in foot/surface interaction during football playing), wherein applying and measuring interactions between prescribed forces, rotational moments, and rotational and linear displacements allows for a safety and/or performance evaluation of a subject, athletic apparel, or an athletic playing surface.

In another embodiment, the invention described herein might be self-powered and equipped with its own actuation system. Such actuation system may be pneumatic, hydraulic, electric, magnetic, or powered through another mechanism. The invention might also be an attachment to a non-dedicated actuation system, for example, the invention can be integrated with another frame and actuation system and or controlling device.

BRIEF DESCRIPTION OF THE DRAWINGS

The accompanying drawings illustrate certain aspects of embodiments of the present invention and should not be used to limit the invention. Together with the written description the drawings explain certain principles of the invention.

FIG. 19 is a depiction of the apparatus for athletic apparel and turf testing, including labeled aspects comprising parts of the apparatus, according to one embodiment of the present invention.

FIG. 22 is a flowchart of the device control according to one embodiment of the present invention.

FIG. 23 is a diagram of the device power architecture according to one embodiment of the present invention.

DETAILED DESCRIPTION OF INVENTION

Figure 1:
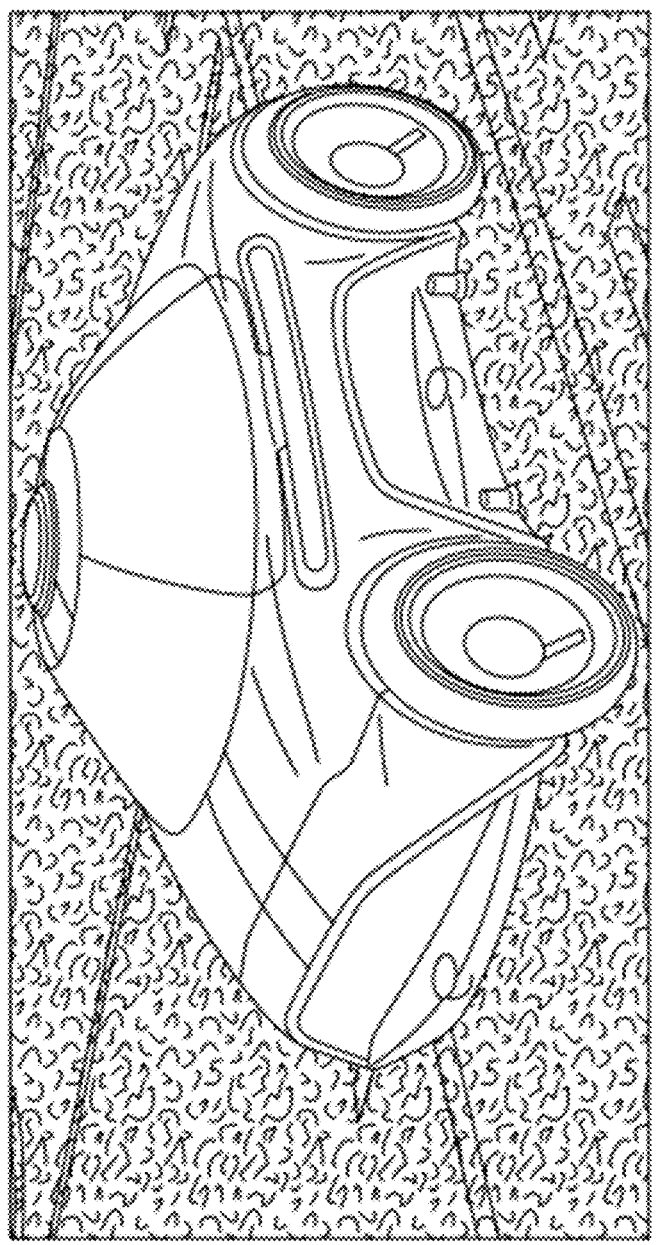
FIG. 1 is a depiction of the apparatus for athletic apparel and turf testing, according to one embodiment of the present invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The present invention can be described in terms of, for example, a foot-form assembly that is preloaded into the ground or turf sample via a tunable vertical load actuator.

The apparatus and associated system can impose a controlled constant or variable shear and compressive forces and/or rotational moment on the foot-form assembly while collecting motion profile data on the cleat/shoe as it engages and releases from the surface. In addition to measurement of the displacements associated with applied forces, the system is also capable of logging the minimum required force required to achieve such release from a specific surface. The force and motion profile between a shoe and surface a shoe or cleat motion relative to the surface matters because on one hand, there is a minimum traction requirement to allow athletes to execute their tasks. On the other hand, too much traction can expose an athlete's foot, leg, or other body part to an injurious scenario. The invention disclosed herein objects to objectively quantify such mechanical interaction between the cleat and the surface.

This data, along with existing tests results (which will be automated, in aspects), will all be recorded and saved, in aspects. This data can be used to identify the differences in quality of playing surfaces, for example, natural and synthetic turf, and the quality of athletic apparel and equipment, In addition to data collected during the shoe-surface interaction test, characteristics of the shoe, equipment, or surface used for the test can be saved and linked with the test data.

The current invention allows for closed-loop control, wherein the system is capable of monitoring force or moment being applied and controlling the force or moment in order to, in aspects, maintain a constantly applied force or moment in a controlled and constant manner. However, in aspects, the apparatus does not necessarily need to provide force or torque in a constant manner and situations may arise where force or moment will not be applied in such a manner; rather the applied force or moment will be variable and/or adjustable. In aspects, the system measures impedance, such that it applies a displacement or velocity and measures forces/moments, for example. The system may also apply and measure admittance, therein applying a force/moment and measuring displacement or velocity; thus, the system may be configured to apply a particular force/torque to measure the impact on, for example, an athletic shoe, a human body or body part, and/or natural or synthetic turf.

In some instances, the system will use prior data knowing what forces or torques typically, usually, or sometimes cause injury to maintain input force/torque applied by the apparatus to determine displacement or movement of a shoe, in aspects, for a given shoe-to-surface combination(s). In embodiments, this may result in a rating or ranking of a shoe and/or surface; in aspects, it can be a pass/fail test, meaning a determination is made whether an athlete can use a particular shoe or not based on the pertinent performance and safety test results. Also, based on test results with a given cleat, shoe or generic representation of a shoe-surface interface, the system can verify condition and maintenance of a field, e.g., within tolerances.

In aspects, the current invention tests mechanical interactions between the cleat- or shoe-to-surface interface using a translation test and a rotation test, and force and motion data are recorded via data acquisition, and therefore the system can record accurate and repeatable results. In aspects, the apparatus is configured to collect on-field displacement, velocity, force and torque data, record impact hardness, measure infill (turf), analyze surface stability (grass), read surface moisture content, perform visual inspection (e.g., via camera or drone), and/or upload or download data manually or automatically.

In aspects, the apparatus processes and displays data tailored for a certain target audience. In aspects, there might be some "hard-coded" data with data analysis built in locally, remotely, or on a server. In another example, the analysis may be performed online via analysis of metadata stored in a server.

The system is capable of objectively scoring surfaces and footwear, and evaluating geographical compliance of a surface with a standard or protocol (using, for example, GPS to evaluate an entire field area or a portion of a field area and recommending localized intervention/maintenance).

Figure 3:
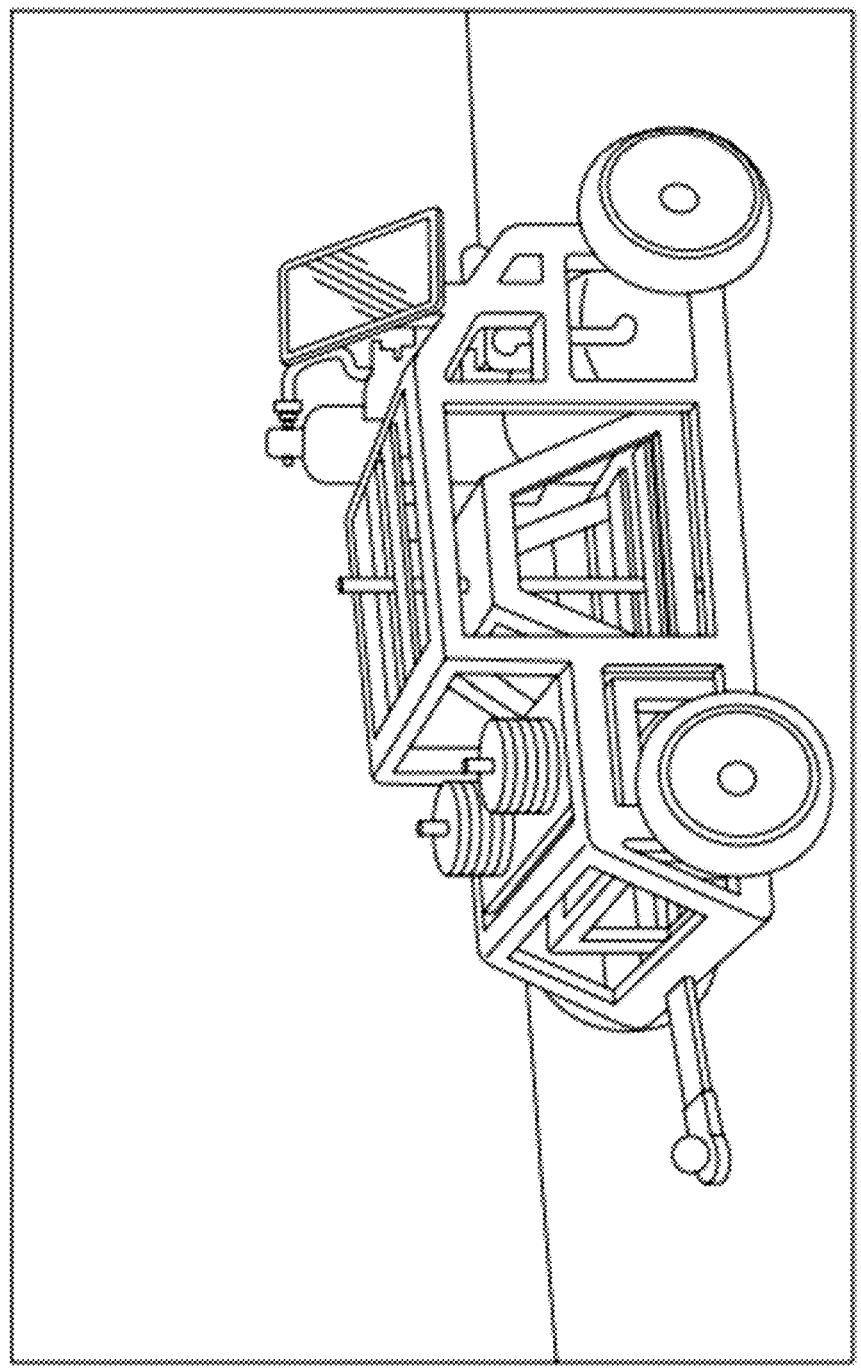
FIG. 3 is a depiction of the apparatus for athletic apparel and turf testing, according to one embodiment of the present invention.
Figure 4:
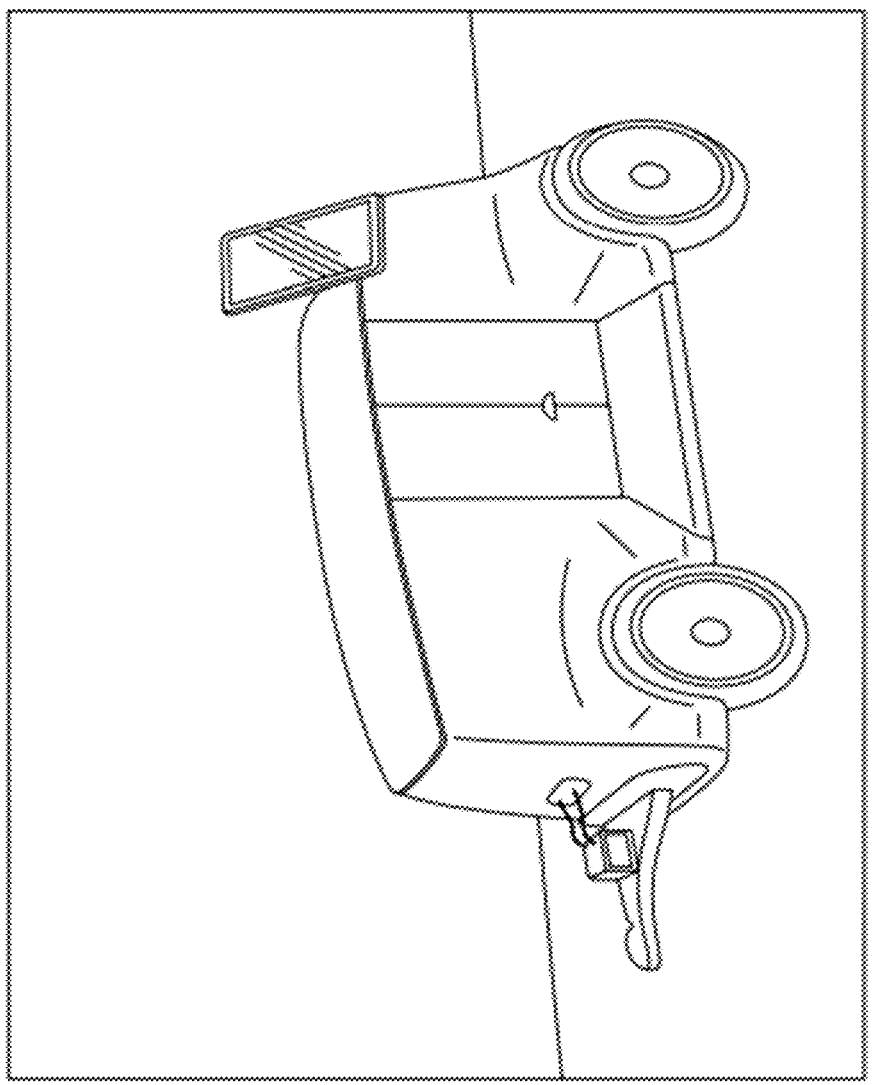
FIG. 4 is a depiction of the apparatus for athletic apparel and turf testing, according to one embodiment of the present invention.
Figure 5:
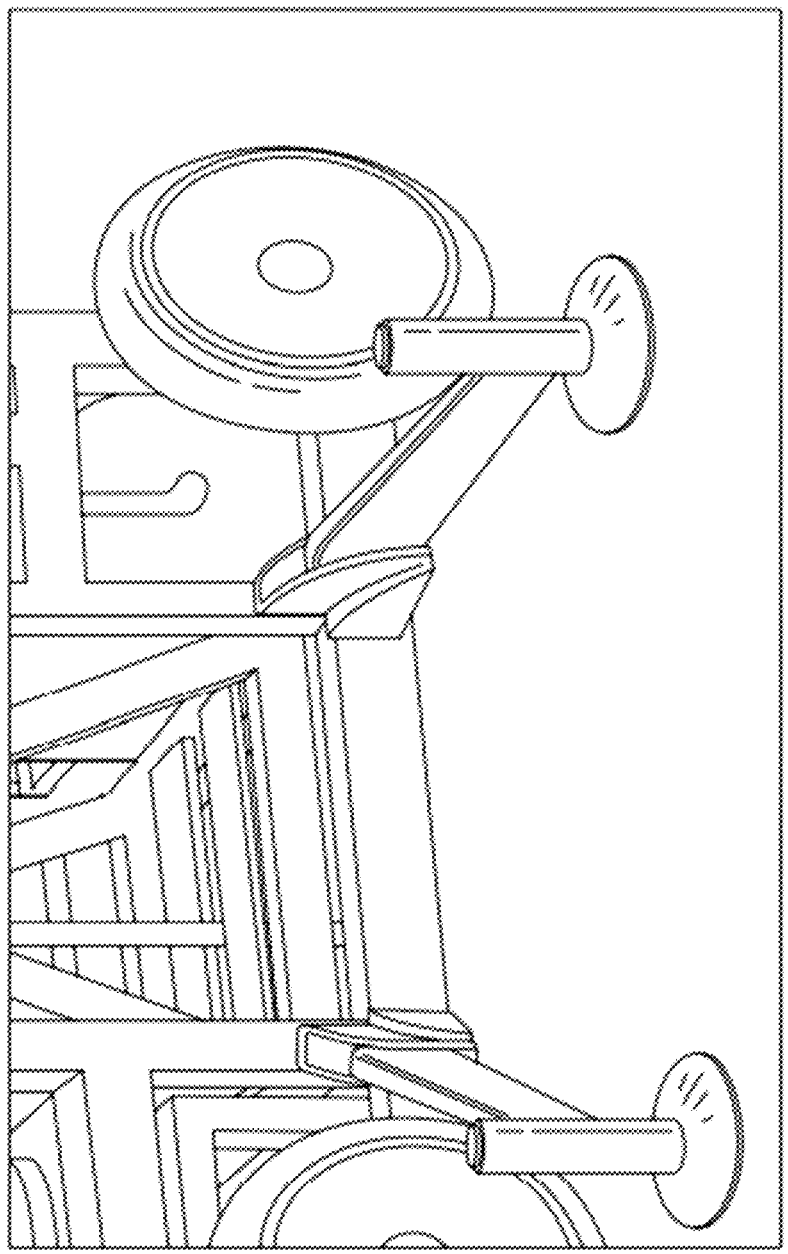
FIG. 5 is a depiction of the apparatus for athletic apparel and turf testing, according to one embodiment of the present invention, including stability fly outs for anchoring the device during testing and/or use.

Turning to the figures, in FIGS. 1-6, and FIGS. 7-9 embodiments are shown comprising certain aspects of the apparatus. In aspects, the apparatus is mobile, wherein the unit may be driven, may be autonomously driven, or may be attached to another vehicle, such as a truck, car, or golf cart (see, e.g., tow hitch attachment or trailer hitch 701, 801, 901). The apparatus may also comprise deployable outriggers, fly outs, or other mechanisms to secure or stabilize the apparatus (711, 811), such as on the turf surface to be tested. (See also, FIG. 5, showing one possible way to secure or stabilize the apparatus during testing.) In aspects, the wheels of the apparatus may be passive, if for example it is towed, but in other embodiments the apparatus may be self-powered in order to be driven by a user or driven autonomously, or by remote control. In embodiments, the apparatus will comprise a data port (706, 806), computer processor, antenna, memory storage unit, receiver, transmitter, controller, battery, charger, charging port, and other electrical components. In aspects, the apparatus may include local positioning system (LPS) or global positioning systems (GPS) or other devices to, for example, register its position relative to the field or surface being tested. The apparatus may comprise a data acquisition system (DAQ) (709, 809), camera 821, actuator drivers (708, 808), and/or control unit (710, 810). In preferred embodiments, the apparatus will not only test cleat/shoe and surface interaction, but also include sensors to test the field conditions, such as a surface impact hardness sensor 716 and a soil moisture sensor 715, and/or an infill depth probe (712, 812). (See FIGS. 7-9.) Regarding the shoe-surface testing aspects, the apparatus may also comprise a test cleat displacement sensor 823, cleat actuator 822, vertical preload actuator (703, 803), transmission (704, 804), adjustment mechanism (705, 805), a test cleat wrench sensor (713, 813) (such as a multi-axis load cell or multiple single axis load cells), an attachment mechanism (such as a plate), and a test cleat (714, 814) for example on a foot-form. In aspects, some of the described elements or all the described elements may be attached directly or indirectly to the apparatus chassis (702, 802, 707). The apparatus may also comprise an Emergency Power Off (EPO). In aspects, see FIG. 8, the apparatus may include basic cosmetics 817, weatherizing components 818, an operator user interface 819, and process automation 820.

In FIGS. 1 and 4, an embodiment of the apparatus is shown also comprising basic cosmetic components (such as, e.g., material covering the internal mechanisms of the apparatus, like panels or molded plastic), weathering protective elements, an operator user interface, and limited process automation. In other embodiments, the apparatus will comprise a camera or other mechanisms to visually inspect the surface, including turf surface. The apparatus may include the camera attached to the apparatus or employ a drone to hover above the surface for visual inspection.

Figure 7:
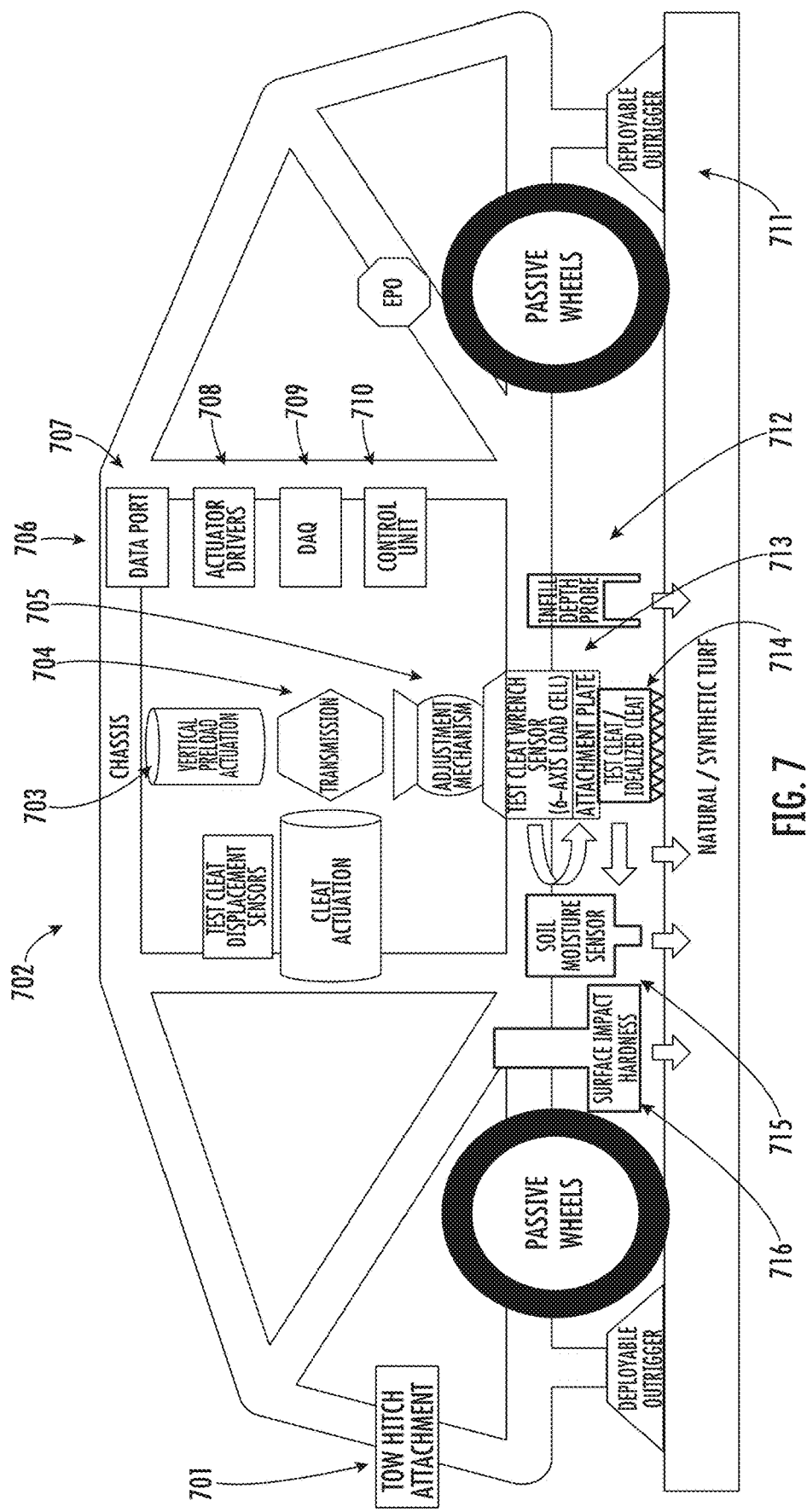
FIG. 7 is a depiction of the apparatus for athletic apparel and turf testing, including labeled aspects comprising parts of the apparatus, according to one embodiment of the present invention.
Figure 8:
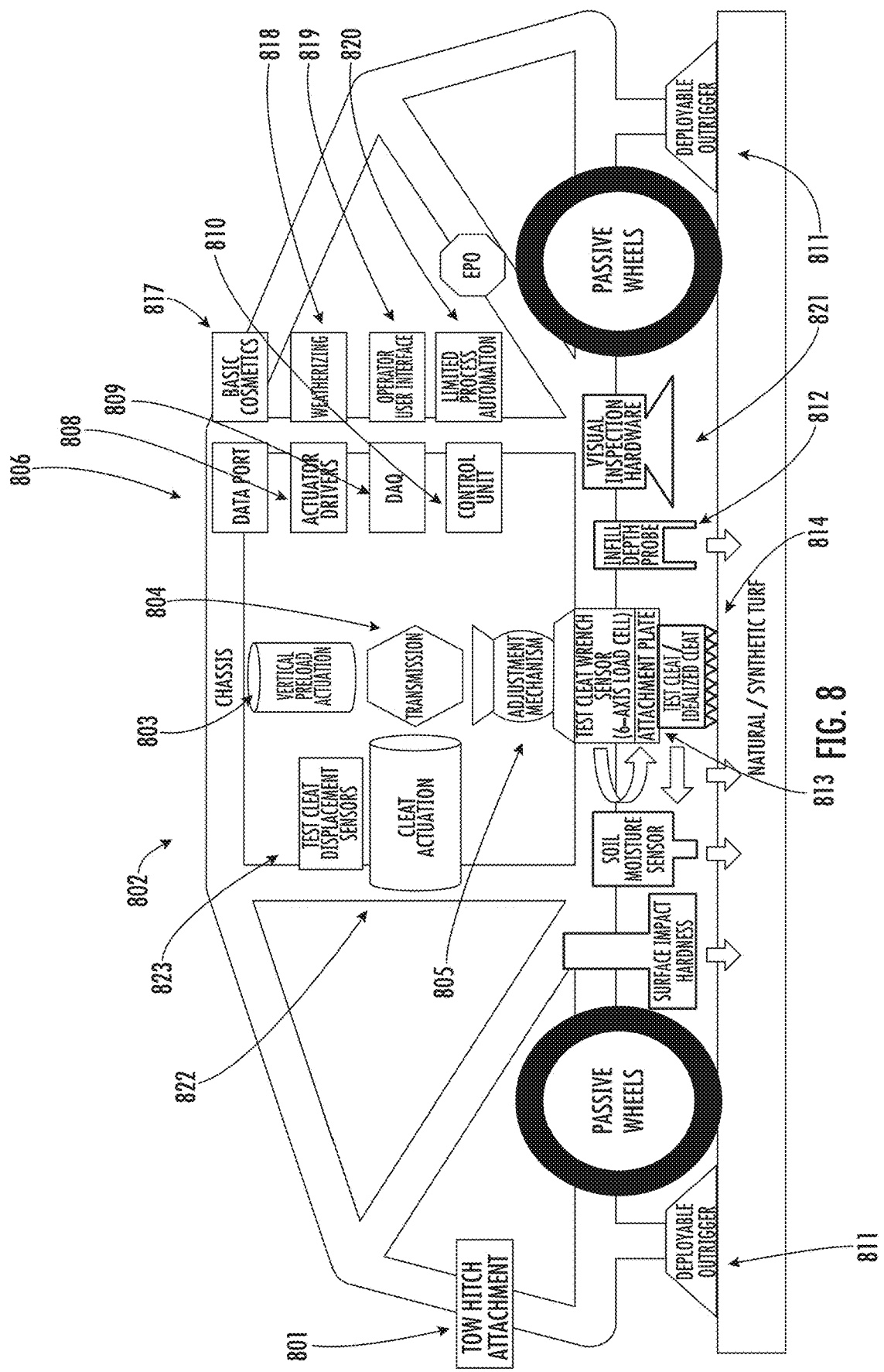
FIG. 8 is a depiction of the apparatus for athletic apparel and turf testing, including labeled aspects comprising parts of the apparatus, according to one embodiment of the present invention.
Figure 9:
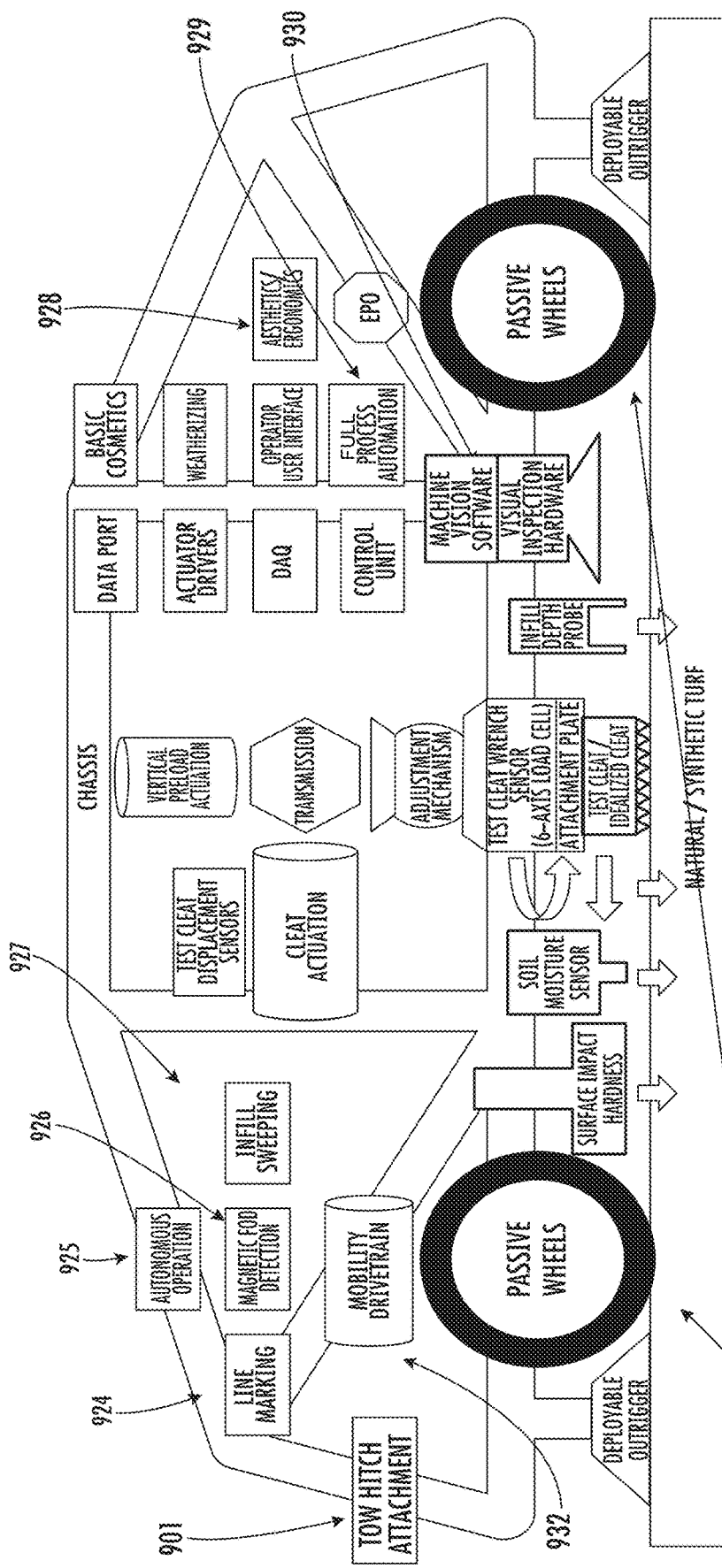
FIG. 9 is a depiction of the apparatus for athletic apparel and turf testing, including labeled aspects comprising parts of the apparatus, according to one embodiment of the present invention.

For system architectural embodiments, shown in FIGS. 7-9, the apparatus may comprise additional elements, including but not limited to the capability to mark lines on the turf 924 (such as hash marks), user interface aesthetics and ergonomics 928, full process automation 929, a mechanism for autonomous operation 925, magnetic foreign object debris (FOD) detection 926, and the capability to infill sweep 927. In the embodiment shown in FIG. 9, for example, the apparatus is shown wherein it can be driven, including driven wheels 931 and a mobility drivetrain 932. This embodiment also shows where the camera or other visual inspection mechanism use machine vision technology/hardware and software 930.

In further aspects of the invention, the apparatus can be configured to include some or all the mentioned elements such as line marking, magnetic FOD detection, infill sweeping, testing infill for bacteria agents, automatic data uploading to server, automated all user processes, fully autonomous system, and/or drone assist full field inspection from above.

Figure 10:
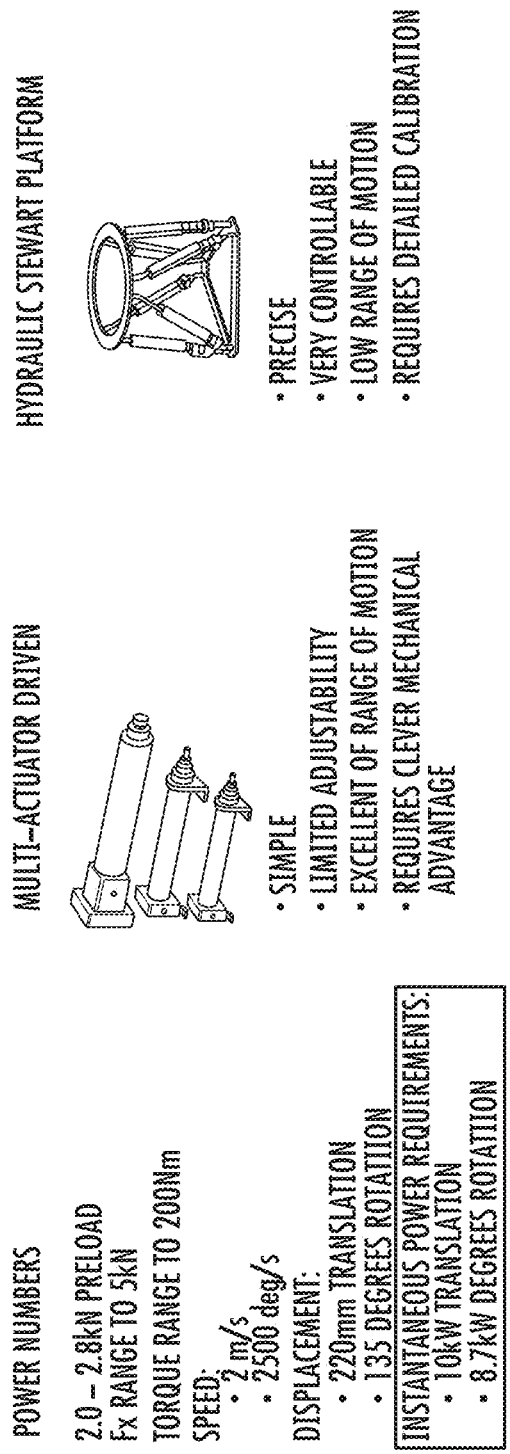
FIG. 10 is a depiction of various aspects of the apparatus for athletic apparel and turf testing, according to one embodiment of the present invention.

As shown in FIGS. 10 and 23, by way of example, the target power numbers may include up to 8-kN in preload, a shear (longitudinal or lateral or oblique) force range up to 10 kN, and a moment range up to 400 Nm. Displacement may include up to 500 mm translation and/or up to 225 degrees rotation. Instantaneous power requirements may be accomplished via a multi-actuator driven system. In other aspects, a hydraulic Stewart platform may be used. Due to the design of the current invention, it allows for higher forces to be applied, including up to providing 400 Newton-meters of torque; up to 8,000 Newtons of vertical force; and up to 10,000 Newtons of horizontal force; individually or at the same time. In a particular embodiment, by way of example, vertical preload may be from 0.10-6.0 kN, translation pull force may be up to 10 kN, rotational torque may be up to 400 Nm, translation speed may be around 3.5 m/s, rotation speed may be around 2500 deg/sec [43.6 rad/s], and cleat-turf interface adjustability is possible in the roll, pitch, and yaw orientations/directions. The invention may also limit compliance of the foot-form in unconstrained degrees of freedom during the shoe-surface interaction, so that test conditions are maintained as accurately as possible. The invention is intended to operate in temperatures ranging from, but not limited to, 0-100 degrees Fahrenheit. In one embodiment of the invention, the size of the invention may be approximately 1 foot long by 1 foot wide by 1 foot high, while the weight may be between 100-1,000 lbs. In another embodiment of the invention, the size of the invention may be approximately 7.0 feet long by 4.0 feet wide by 4.0 feet high, while the weight may be between 1,000-3,000 lbs.

Figure 2:
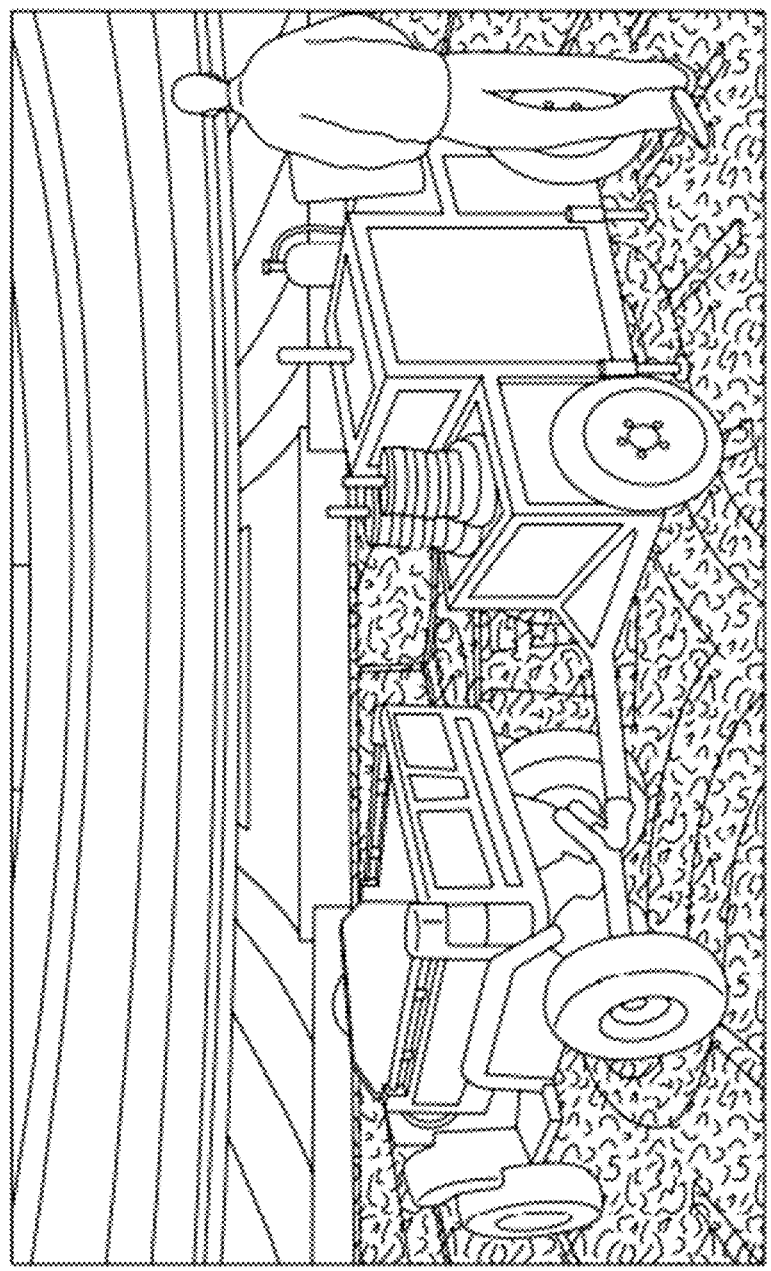
FIG. 2 is a depiction of the apparatus for athletic apparel and turf testing, according to one embodiment of the present invention.
Figure 11:
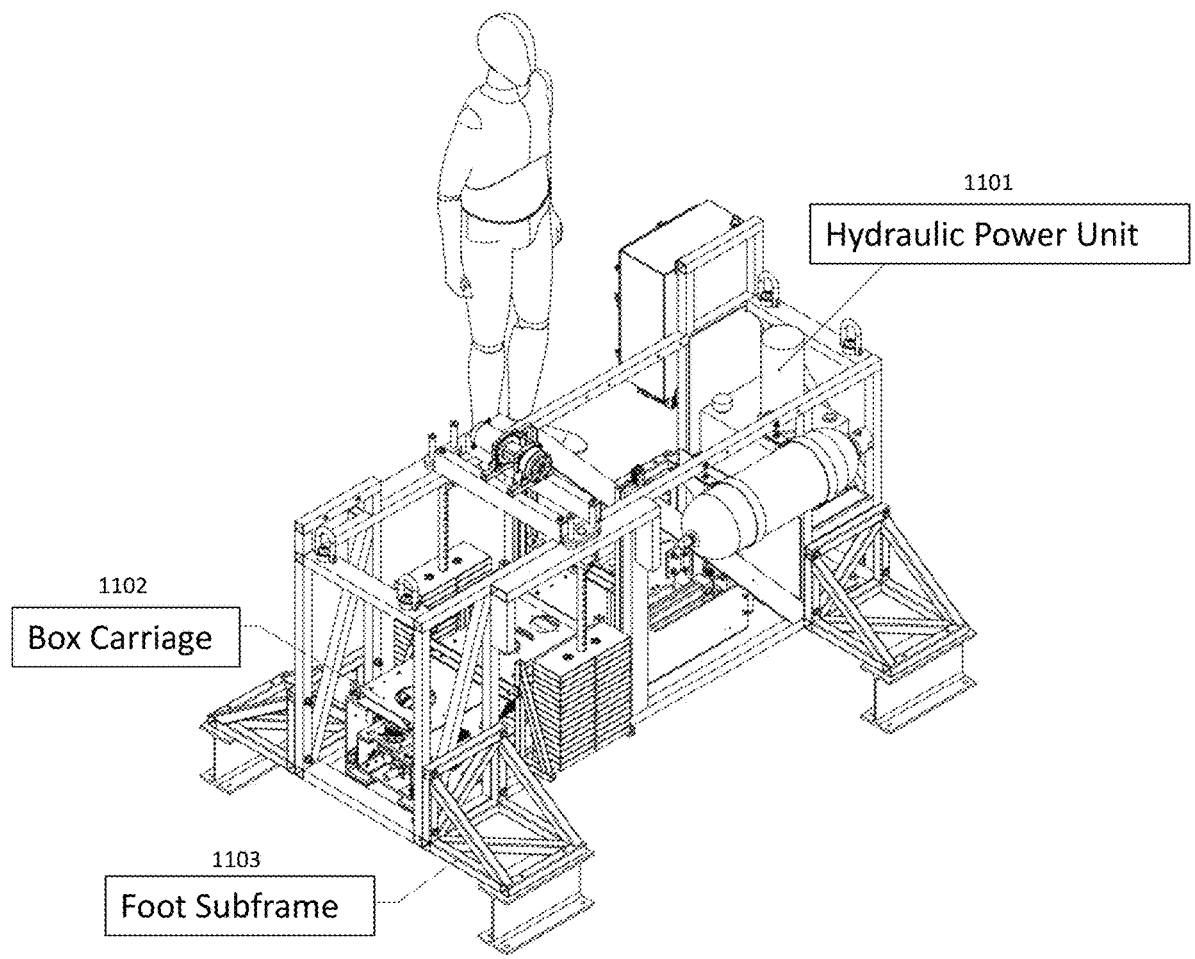
FIG. 11 is a depiction of the apparatus for athletic apparel and turf testing, including labeled aspects comprising parts of the apparatus, according to one embodiment of the present invention.
Figure 12:
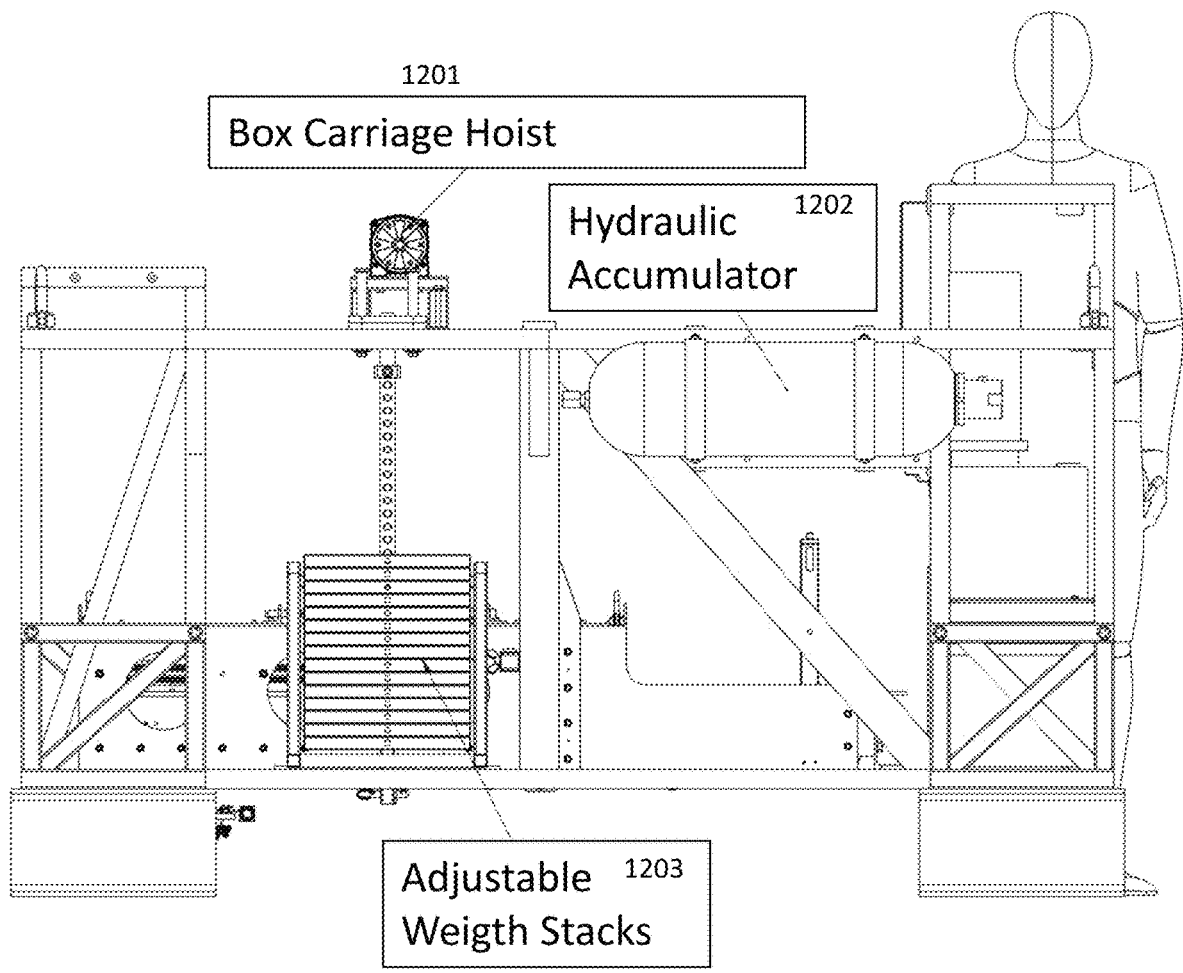
FIG. 12 is a depiction of the apparatus for athletic apparel and turf testing, including labeled aspects comprising parts of the apparatus, according to one embodiment of the present invention.
Figure 13:
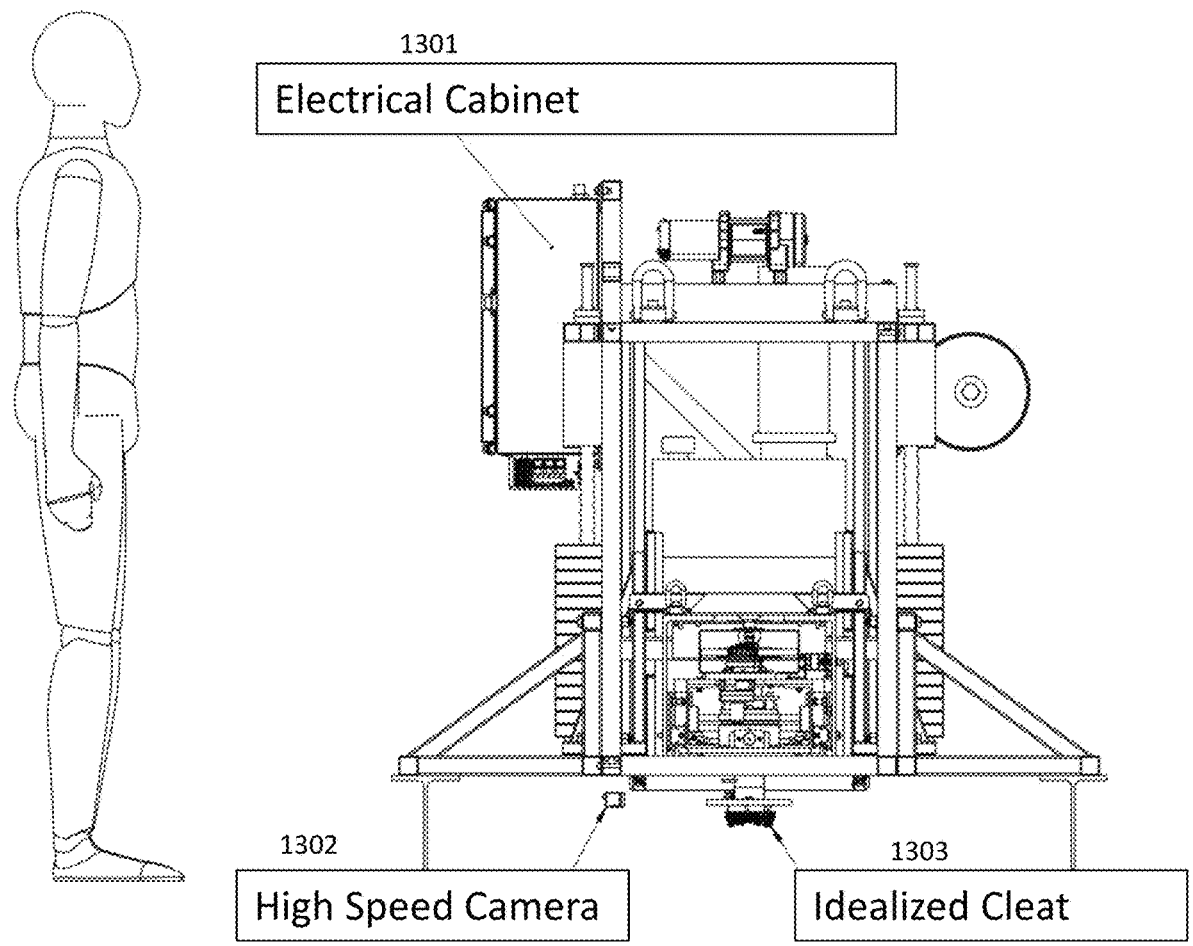
FIG. 13 is a depiction of the apparatus for athletic apparel and turf testing, including labeled aspects comprising parts of the apparatus, according to one embodiment of the present invention.
Figure 14:
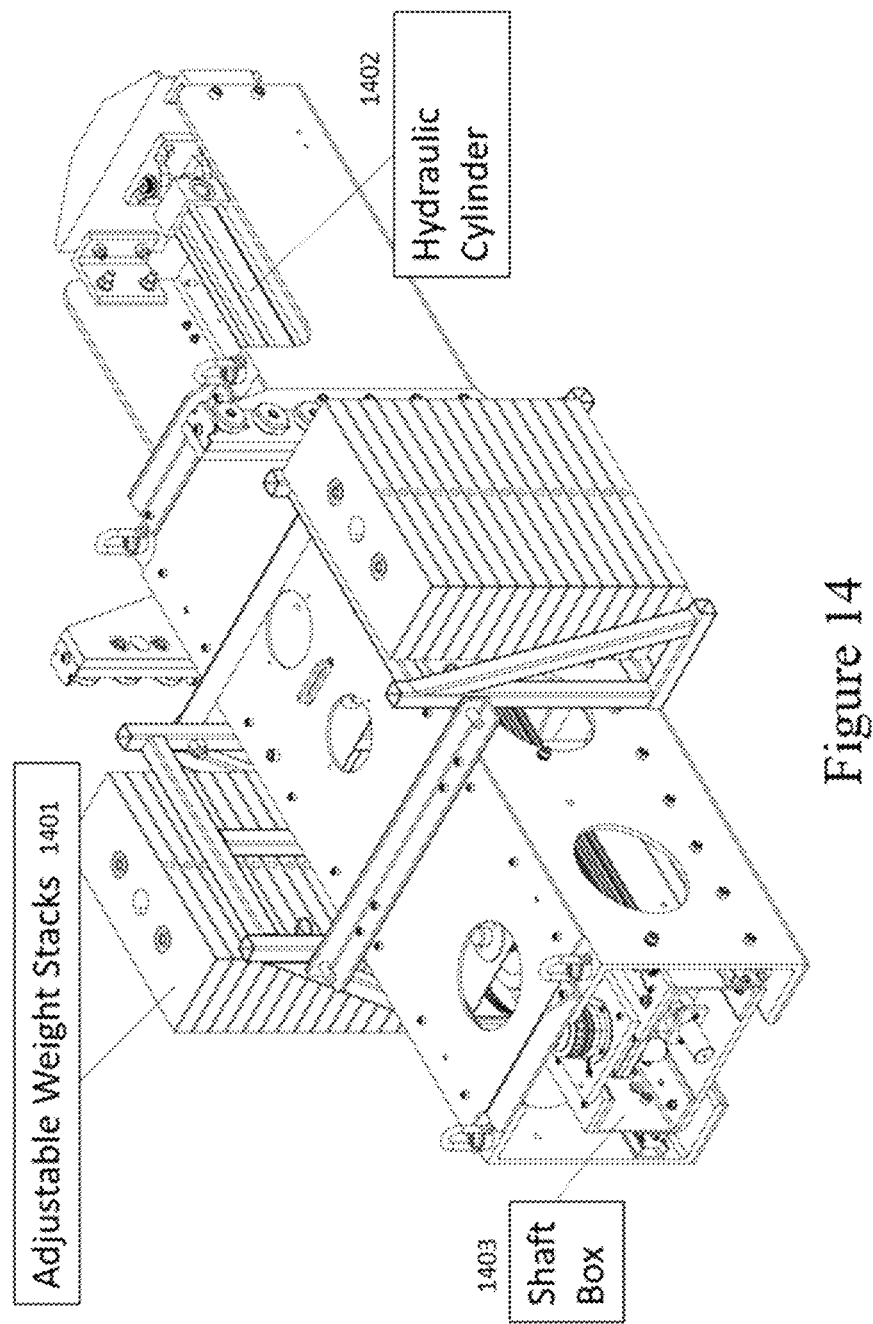
FIG. 14 is a depiction of the apparatus for athletic apparel and turf testing, including labeled aspects comprising parts of the apparatus, according to one embodiment of the present invention.
Figure 15:
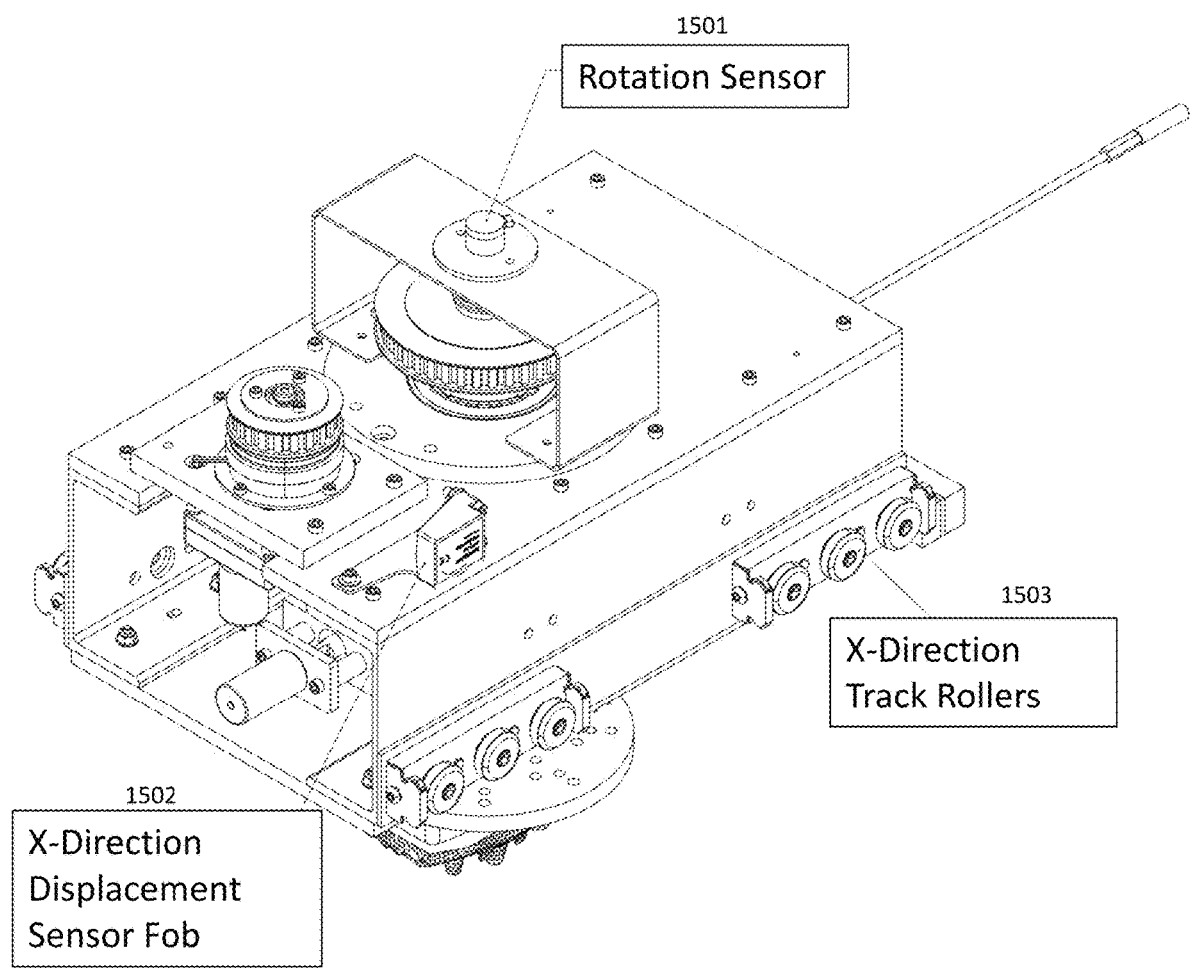
FIG. 15 is a depiction of the apparatus for athletic apparel and turf testing, including labeled aspects comprising parts of the apparatus, according to one embodiment of the present invention.
Figure 16:
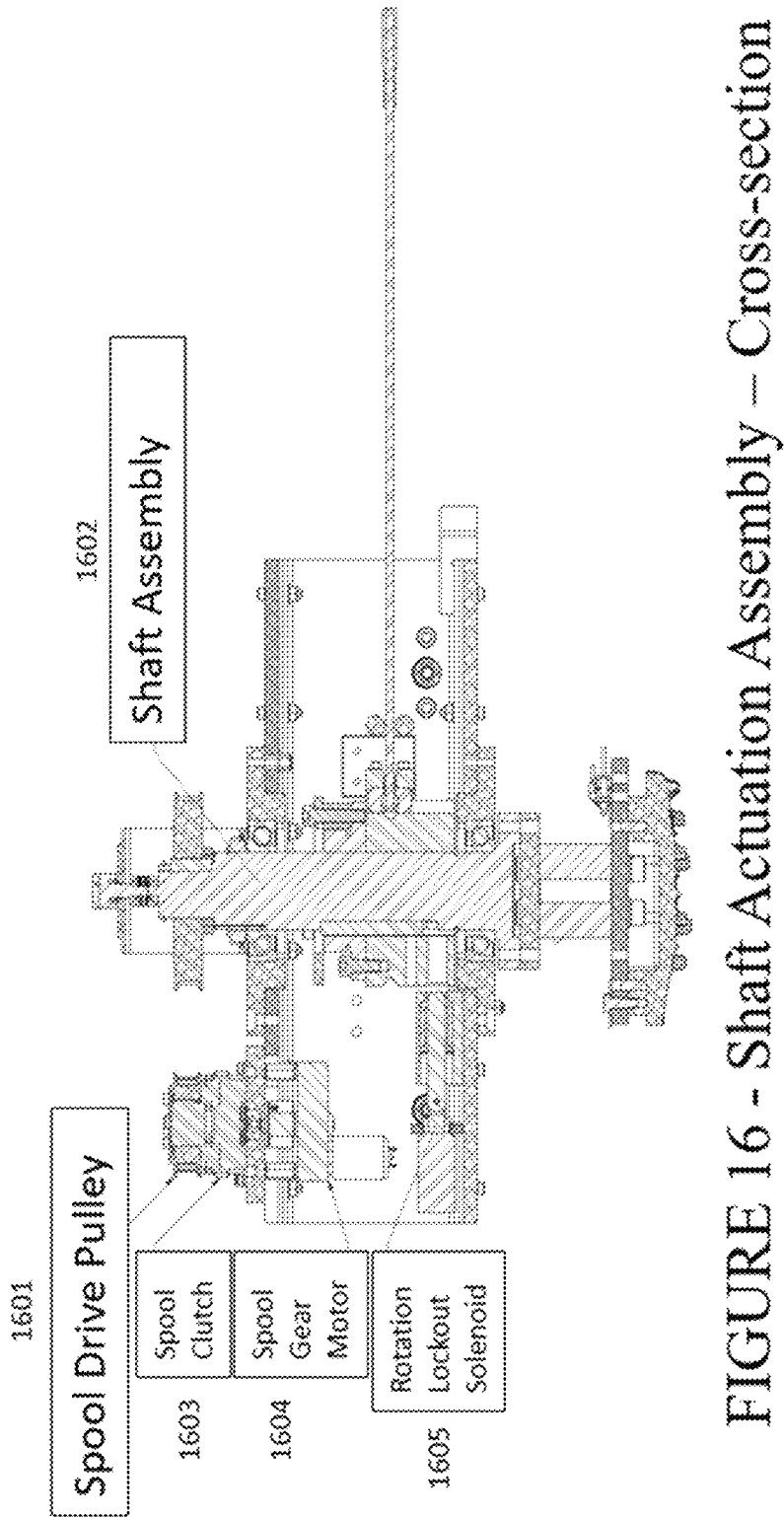
FIG. 16 is a depiction of the apparatus for athletic apparel and turf testing, including labeled aspects comprising parts of the apparatus, according to one embodiment of the present invention.
Figure 17:
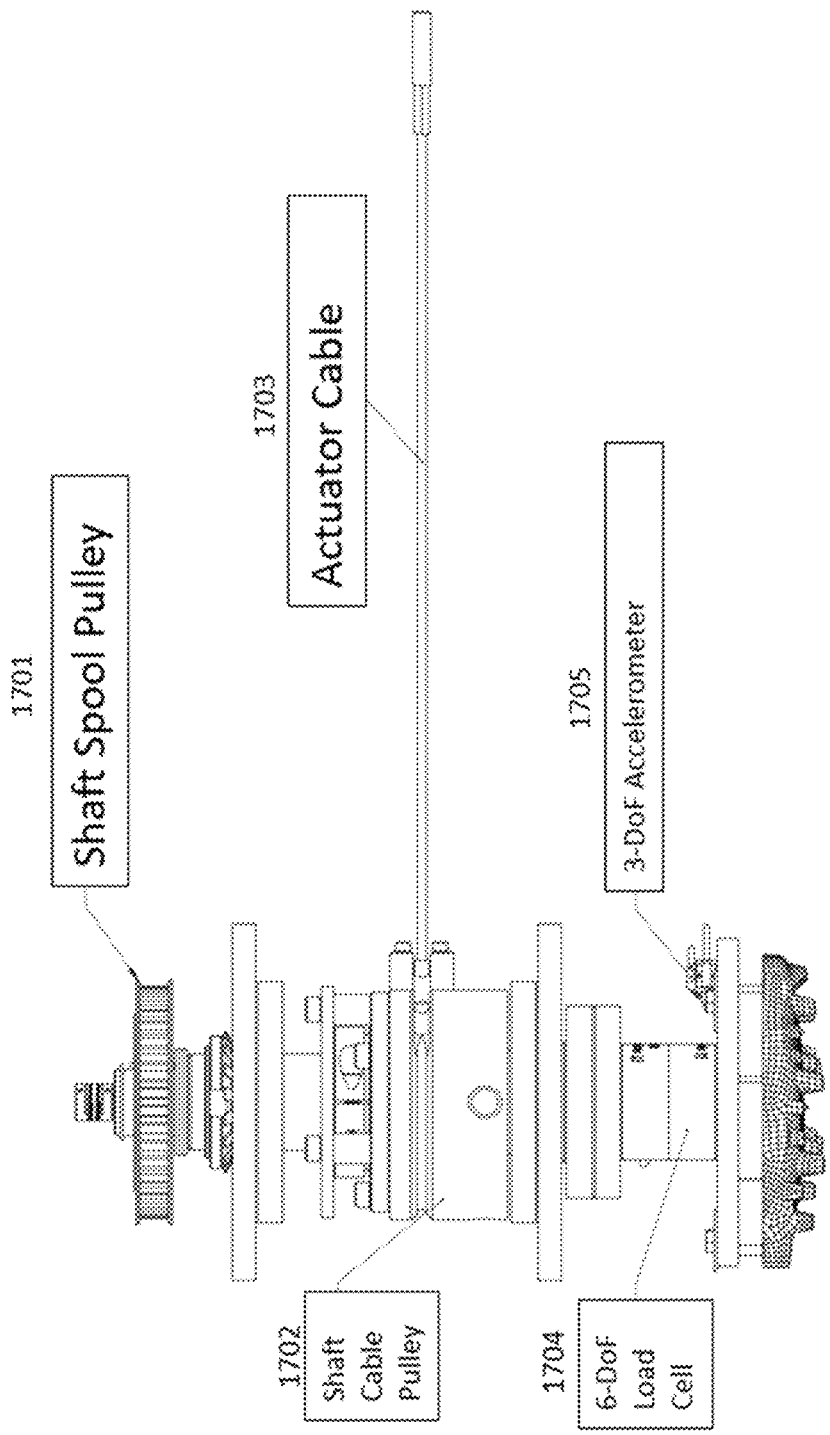
FIG. 17 is a depiction of the apparatus for athletic apparel and turf testing, including labeled aspects comprising parts of the apparatus, according to one embodiment of the present invention.
Figure 18:
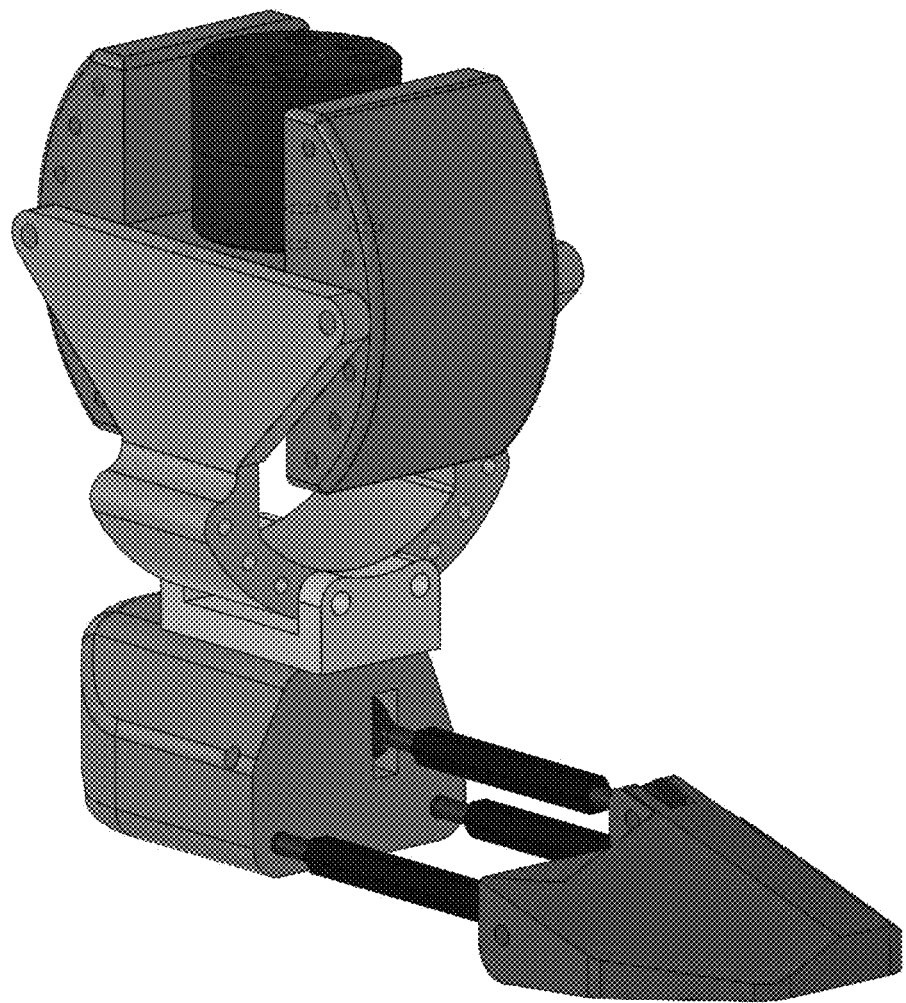
FIG. 18 is a depiction of an aspects of the apparatus for athletic apparel and turf testing, according to one embodiment of the present invention.
Figure 20A:
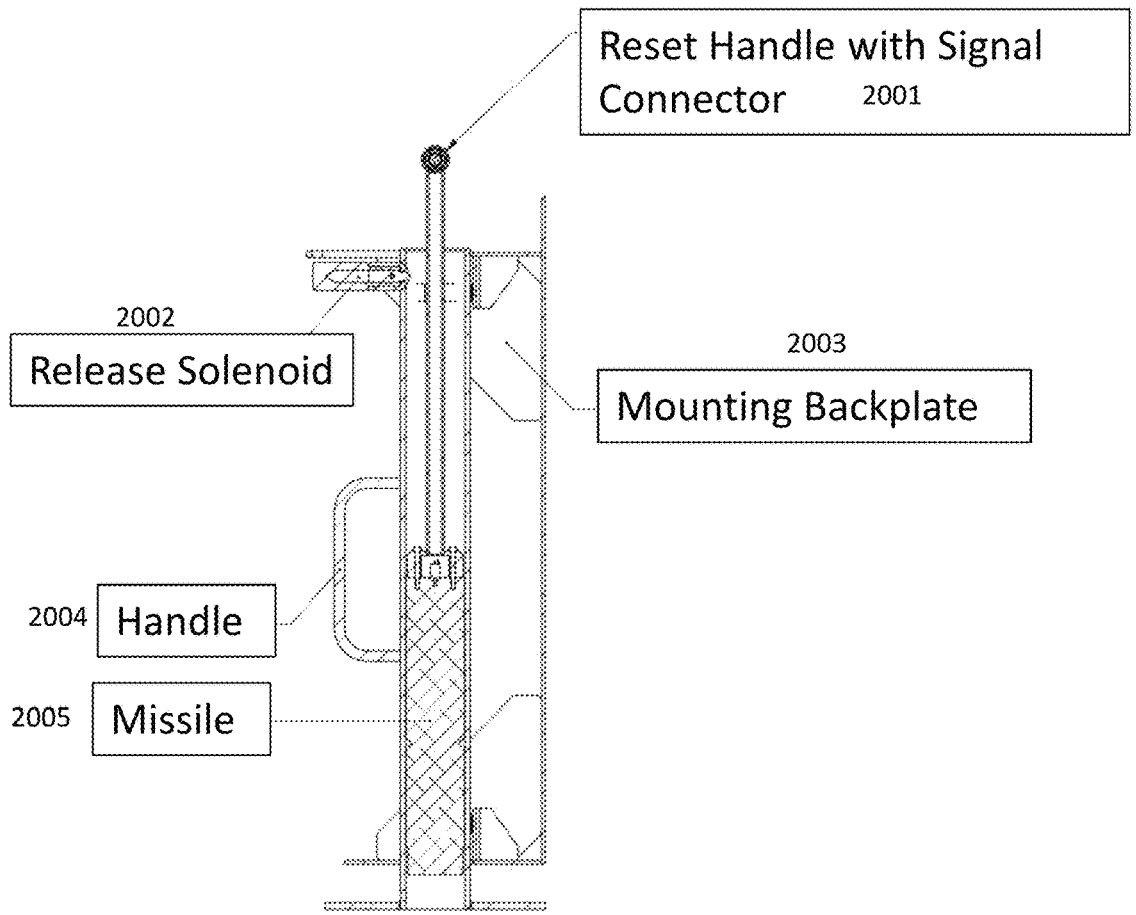
FIG. 20A is a depiction of the apparatus for athletic apparel and turf testing, including labeled aspects comprising parts of the apparatus, according to one embodiment of the present invention.
Figure 20B:
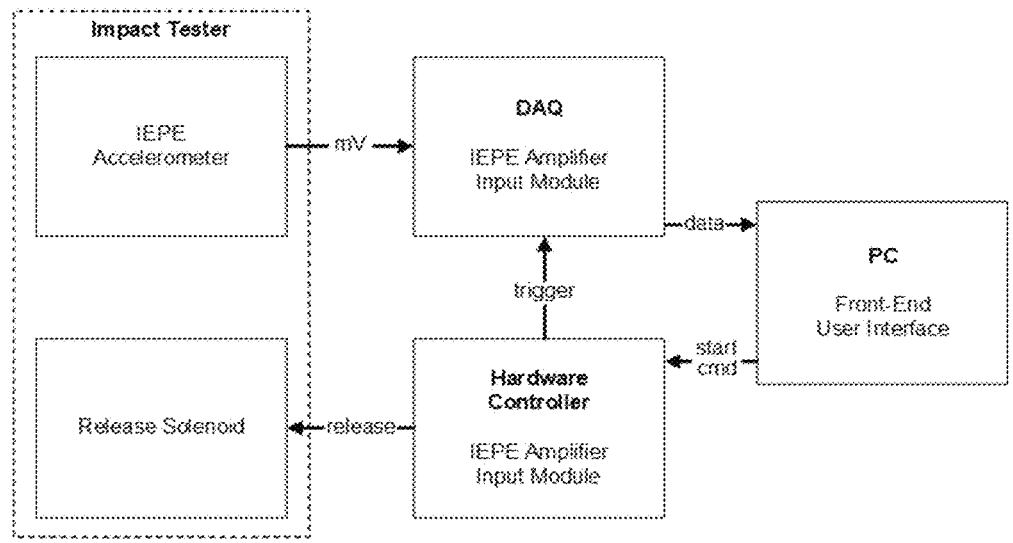
FIG. 20B is a diagram of an integration data collection logic loop according to an embodiment of the present invention.
Figure 21:
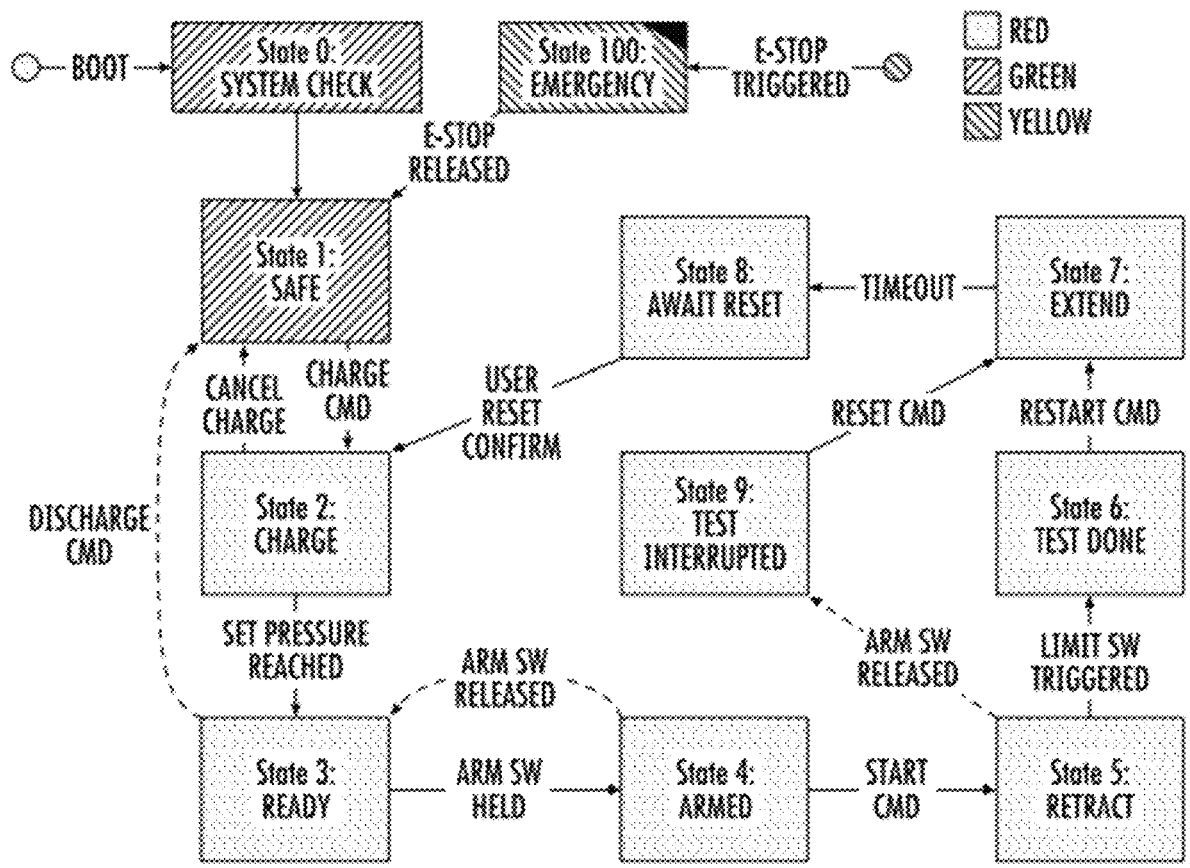
FIG. 21 is a depiction of the actuation architecture according to one embodiment of the present invention.

Design schematics comprise several other Figures. FIG. 1 shows an embodiment of the invention including aesthetic paneling and molded material covering the internal structure of the apparatus. In this particular embodiment, the apparatus may be driven manually or autonomously, or by remote control. In FIG. 2 and FIG. 3, an embodiment is shown of the apparatus wherein it is passive and towed by another vehicle, with and without exterior body panels. Similarly, in FIGS. 5 and 6, the apparatus is shown with add-ons that extend capability by increasing stability and with touchscreen human-machine interface, respectively. FIGS. 7-9 show embodiments of system architecture of the core device (see, e.g., FIG. 7), as well as with add-on systems that extend capability, such as computer vision (see, e.g., FIG. 8), and self-propulsion (see, e.g., FIG. 9). FIG. 10 is an example of hardware available for test actuation in the load and rate regimes to replicate athlete cleat-turf interactions. FIGS. 11-13 show embodiments of design schematics for the full device in isometric, side, and front reliefs, respectively. A notional human is provided for scale. Specifically, FIG. 11 shows the apparatus including a box carriage 1102, hydraulic power unit 1101, and foot subframe 1103. FIG. 12 shows the apparatus including a box carriage hoist 1201, a hydraulic accumulator 1202, and an adjustable weight stack 1203. FIG. 13 shows the apparatus including an electrical cabinet 1301, a high-speed camera 1302, and an idealized cleat 1303. FIGS. 14-17 show design schematics for embodiments of the mechanical subsystems governing the mechanism translation (see FIG. 14) and rotation (see FIGS. 15-17). Specifically, FIG. 14 shows a subsystem including adjustable weight stacks 1401, hydraulic cylinder 1402, and a shaft box 1403. FIG. 15 shows a subsystem including a rotation sensor 1501, an x-direction displacement sensor fob 1502, and x-direction track rollers 1503. FIG. 16 shows a subsystem including a spool drive pulley 1601, a shaft assembly 1602, a spool clutch 1603, a spool gear motor 1604, and a rotation lockout solenoid 1605. FIG. 17 shows a subsystem including a shaft spool pulley 1701, a shaft cable pulley 1702, an actuator cable 1703, a 6-DoF load cell 1704, and a 3-DoF accelerometer 1705. FIG. 18 is a design schematic of an embodiment of the surrogate foot-form, capable of articulating at the 'ankle' and 'toe' joints, in this example, whilst being shod in standard footwear. FIG. 19 is a design schematic of an embodiment of the turf datum finder for establishing a reference height of the turf relative to the rest of the device actuation assembly, including a non-contact limit switch 1901, a cage with mounting flange 1902, and a probe stem 1903. FIG. 20A shows a design schematic of an embodiment of the impact test device, including a reset handle with signal connection 2001, a release solenoid 2002, a mounting backplate 2003, a handle 2004, and a missile 2005, and FIG. 20B shows its integration data collection logic loop. FIG. 21 is a diagram outlining an embodiment of the actuator and power states of the device during different set points in the acquisition process. FIG. 22 shows and automatic control logic diagram for an embodiment of the device, allowing for the use of real-time or near-real-time computer-mediated adjustments to the device actuation in response to the loads/moments perceived at the cleat-turf interface. FIG. 23 is a power flow diagram outlining an embodiment of how the electrical and pneumatic power systems communicate across the device to actuate the device mechanism.

Figure 6:
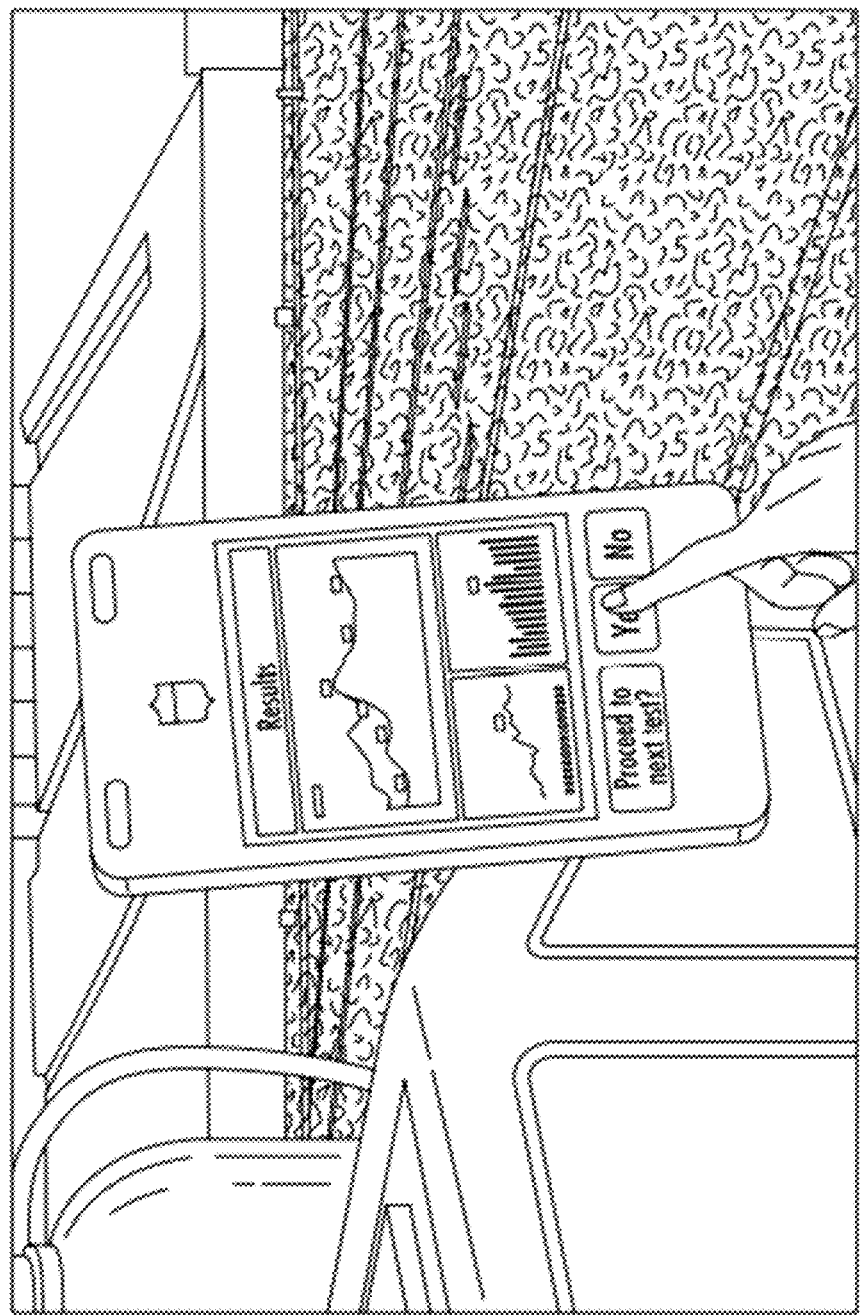
FIG. 6 is a depiction showing using the apparatus via a touchscreen computer module (e.g., a tablet computer or mobile phone), according to one embodiment of the present invention.

FIG. 6 shows that a tablet computer, mobile phone, or other portable electronic device may be used to control the apparatus and/or review the test data, by way of example only. Embodiments of the invention include a computer readable medium comprising one or more computer files comprising a set of computer-executable instructions for performing one or more of the calculations, steps, processes, and operations described and/or depicted herein. In exemplary embodiments, the files may be stored contiguously or non-contiguously on the computer-readable medium. In aspects, the files or data may be sent directly or indirectly to the cloud or remote servers(s). Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), and RAM. In exemplary embodiments, the computer readable medium has a set of instructions stored thereon which, when executed by a processor, cause the processor to perform tasks, based on data stored in the electronic database or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers or involve a network of remote servers hosted on the internet. In aspects, local, edge, or remote computing possibilities are used to store, manage, and process data. A skilled artisan will further appreciate, in light of this disclosure, how the invention can be implemented, in addition to software, using hardware or firmware. As such, as used herein, the operations of the invention can be implemented in a system comprising a combination of software, hardware, or firmware.

Embodiments of this disclosure include one or more computers or devices loaded with a set of the computer-executable instructions described herein. The computers or devices may be a general-purpose computer, a special-purpose computer, or other programmable data processing apparatus to produce a particular machine, such that the one or more computers or devices are instructed and configured to carry out the calculations, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (i.e., processor) and a form of computer-readable memory which may include random-access memory (RAM) or read-only memory (ROM). The computer-executable instructions can be embedded in computer hardware or stored in the computer-readable memory such that the computer or device may be directed to perform one or more of the calculations, steps, processes, and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output interfaces may include a graphical user interface (GUI) which may be used in conjunction with the computer-executable code and electronic databases. The graphical user interface may allow a user to perform these tasks through the use of text fields, check boxes, pull-downs, command buttons, and the like. A skilled artisan will appreciate how such graphical features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An apparatus configured to apply static or dynamic kinetics or kinematics at one or more prescribed levels or rates, the apparatus comprising:
   a hydraulic power unit and/or weights for forcing a translation-rotation footform having roll, pitch, and yaw adjustability onto or into a surface, wherein the footform is capable of being shod with footwear, and wherein the footform shod with footwear engages with the surface to apply horizontal, vertical, and rotational forces to the footform; and
   one or more processors configured to receive information from one or more sensors sensing horizontal, vertical, and rotational forces experienced by the footform before, during, or after it engages with the surface, wherein the one or more processors are further configured to evaluate safety and/or performance of the footwear, the surface, or both, based on information received from the one or more sensors sensing the horizontal, vertical, and rotational forces experienced by the footform before, during, or after it engages with the surface;

wherein the apparatus mimics or substantially mimics a behavior or a motion of a human foot during an athletic movement, wherein applying and measuring interactions between the apparatus and the surface at a same or different time or times allows for the safety and/or performance evaluation of the footwear, the surface, or both.

2. The apparatus of claim 1, further comprising a user interface capable of generating or presenting data, data analysis, or data interpretation.

3. The apparatus of claim 1, wherein the one or more processors are located remotely from the apparatus.

4. The apparatus of claim 3, wherein the one or more processors communicates with a remote electronic device.

5. The apparatus of claim 1, further comprising an appendage that interfaces with the surface.

6. The apparatus of claim 5, wherein the apparatus collects data from the appendage interfacing with the surface, and wherein the apparatus, a user of the apparatus, the one or more processors, or a computer analyzing data from the apparatus, measures or evaluates appendage/athletic playing surface dynamics based on data from a prescribed interaction.

7. The apparatus of claim 5, further comprising an end effector attached to a kinematic and kinetic actuation mechanism via a multi-axis load cell capable of measuring the kinetics of the end effector.

8. The apparatus of claim 5, wherein the one or more sensors include one or more rotational sensors and one or more translational displacement sensors, wherein the one or more processors is capable of recording data from the one or more rotational sensors and the one or more translational displacement sensors.

9. The apparatus of claim 8, wherein the one or more processors in conjunction with the one or more rotational sensors or the one or more translational displacement sensors can detect a linear and angular position and velocity of the appendage.

10. The apparatus of claim 5, wherein accelerations of the appendage are measured to characterize an interaction of the footwear with the surface.

11. The apparatus of claim 5, wherein accelerations of the appendage are measured to characterize inertial effects of the apparatus during use.

12. The apparatus of claim 1, further comprising one or more cameras providing computer-aided visual inspection of the surface.

13. The apparatus of claim 12, wherein the one or more cameras coupled with the one or more processors provide computer-aided visual inspection of the surface before, during, or after the apparatus applies and measures the interactions between the prescribed forces.

14. The apparatus of claim 12, wherein the visual inspection uses machine learning visual recognition technologies and/or data synchronization.

15. The apparatus of claim 1, wherein the one or more sensors are capable of measuring impact characteristics, including one or more of energy absorption and rebound/return, peak deceleration, time to reach peak deceleration, vertical displacement, or combinations thereof, through measurement of acceleration of a mass or mass-spring system dropped onto the surface.

16. The apparatus of claim 15, further comprising one or more additional sensors capable of measuring surface hardness.

17. The apparatus of claim 1, further comprising one or more depth measurement mechanisms or sensors.

18. The apparatus of claim 1, further comprising one or more additional sensors capable of assessing surface stability using surface shear resistance and/or a connected shear vane.

19. The apparatus of claim 1, further comprising one or more additional sensors capable of detecting surface moisture levels.

20. The apparatus of claim 1, further comprising one or more additional sensors capable of measuring environmental factors, including one or more of air temperature, ground temperature, surface temperature, air humidity, or combinations thereof.

21. The apparatus of claim 1, further comprising one or more additional sensors capable of measuring or evaluating the evenness and consistency the surface.

22. The apparatus of claim 1, wherein the one or more processors are capable of providing scoring or rankings of the footwear, the surface, or both.

23. The apparatus of claim 1, wherein the apparatus is capable of providing one or more of the following capabilities:
   (a) compile test results and display them through a user interface;
   (b) compare test results against hard-coded or server-based scientifically determined baseline data to score test results against;
   (c) compile and analyze test results with other test result streams and display to a user;
   (d) retrieve historical results from tests and compare with baseline hard-coded data or compare the retrieved historical results with new test data;
   (e) evaluate and score geographical consistency of a surface by registering more than one test with location using Global Positioning System and analyzing test results from multiple locations using correlation, coefficient of variation, standard error, standard deviation, or combinations thereof to assess variability;
   (f) score or rank the footwear by analyzing a mechanical response of different footwear;
   (g) flag or recommend localized intervention if the surface does not meet performance and safety criteria;
   (h) collect, register, synchronize, retrieve, and/or analyze metadata related to the footwear, the surface, or both; and/or
   (i) display a video of a test against test results.

* * * * *